United States Patent
Alsharif et al.

(10) Patent No.: US 12,092,718 B2
(45) Date of Patent: *Sep. 17, 2024

(54) HIGH-ACCURACY VELOCITY AND RANGE ESTIMATION OF A MOVING TARGET USING DIFFERENTIAL ZADOFF-CHU CODES

(71) Applicant: KING ABDULLAH UNIVERSITY OF SCIENCE AND TECHNOLOGY, Thuwal (SA)

(72) Inventors: Mohammed Hussain Alsharif, Thuwal (SA); Tareq Yousef Alnaffouri, Thuwal (SA); Mohamed Saadeldin, Thuwal (SA); Mohamed Siala, Aryanah (TN)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 205 days.

This patent is subject to a terminal disclaimer.

(21) Appl. No.: 17/603,401

(22) PCT Filed: Apr. 16, 2020

(86) PCT No.: PCT/IB2020/053630
§ 371 (c)(1),
(2) Date: Oct. 13, 2021

(87) PCT Pub. No.: WO2020/217146
PCT Pub. Date: Oct. 29, 2020

(65) Prior Publication Data
US 2022/0187436 A1    Jun. 16, 2022

Related U.S. Application Data

(60) Provisional application No. 62/836,879, filed on Apr. 22, 2019.

(51) Int. Cl.
*H04J 13/00*    (2011.01)
*G01S 3/808*    (2006.01)
(Continued)

(52) U.S. Cl.
CPC ............... *G01S 11/14* (2013.01); *G01S 3/808* (2013.01); *G01S 15/74* (2013.01); *H04J 13/0062* (2013.01)

(58) Field of Classification Search
CPC ....... G01S 11/14; G01S 3/808; H04J 13/0062
See application file for complete search history.

(56) References Cited

U.S. PATENT DOCUMENTS

2010/0322332 A1*  12/2010  Zheng .................... H04L 5/0044
                                                    375/260
2017/0201361 A1*   7/2017  Xu ......................... H04L 5/0023

OTHER PUBLICATIONS

Zhang et al., "A Comparative Study of Time-Delay Estimation Techniques Using Microphone Arrays" 'School of Engineering Report No. 619' by Department of Electrical and Computer Engineering, The University of Auckland, Private Bag 92019, Auckland, New Zealand, (Year: 2005).*

(Continued)

*Primary Examiner* — Hovhannes Baghdasaryan
*Assistant Examiner* — Abdallah Abulaban
(74) *Attorney, Agent, or Firm* — PATENT PORTFOLIO BUILDERS PLLC

(57) ABSTRACT

A method for estimating a range of a moving target, the method including emitting, from a target, a first ultrasound signal T, wherein the first ultrasound signal T is generated based on a first differential Zadoff-Chu sequence x; receiving, at a receiver, a second ultrasound signal R, which corresponds to the first ultrasound signal T, wherein the second ultrasound signal R includes a second differential Zadoff-Chu sequence y; correlating the first ultrasound signal T with the second ultrasound signal R to calculate an (Continued)

initial time of flight estimate $\mathrm{tau}_{corr}$; and calculating an initial range estimate $d_{corr}$ by multiplying the initial time of flight estimate $\mathrm{tau}_{corr}$ with a speed of sound c. A differential Zadoff-Chu sequence is different from a Zadoff-Chu sequence.

18 Claims, 22 Drawing Sheets

(51) Int. Cl.
    *G01S 11/14*     (2006.01)
    *G01S 15/74*     (2006.01)

(56) References Cited

OTHER PUBLICATIONS

Alsharif, M.H., et al., "Zadoff-Chu Coded Ultrasonic Signal for Accurate Range Estimation," 2017 25th European Signal Processing Conference (EUSIPCO), Aug. 28-Sep. 2, 2017, pp. 1250-1254 (6 pages total).

Cai, C., et al., "A Survey on Acoustic Sensing," ACM Computing Surveys, vol. V, No. N, Article A, Jan. 2019, arxiv.org, Cornell University Library, arXiv:1901.03450v1 [cs.SD] Jan. 11, 2019), pp. A:1-A:33 (34 pages total).

Murano, S., et al., "Comparison of Zadoff-Chu Encoded Modulation Schemes in an Ultrasonic Local Positioning System," 2018 International Conference on Indoor Positioning and Indoor Navigation (IPIN), Nantes, France, Sep. 24-27, 2018, pp. 206-212 (8 pages total).

Naftali, E., et al., "Necessary conditions for a maximum likelihood estimate to become asymptotically unbiased and attain the Cramer-Rao Lower Bound. Part I. General approach with an application to time-delay and Doppler shift estimation," The Journal of the Acoustical Society of America, vol. 110, No. 4, Oct. 2001, pp. 1917-1930.

PCT International Search Report (Forms PCT/ISA/220 and PCT/ISA/210) for International Application No. PCT/IB2020/053630 dated Jun. 12, 2020.

PCT Written Opinion of the International Searching Authority (Form PCT/ISA/237) for International Application No. PCT/IB2020/053630 dated Jun. 12, 2020.

Saad, M.M., et al., "Robust High Accuracy Ultrasonic Range Measurement System," IEEE Transactions on Instrumentation and Measurement, vol. 60, No. 10, Oct. 2011, pp. 3334-3341 (9 pages total).

Chu, D.C., "Polyphase Codes with Good Periodic Correlation Properties," IEEE Transactions on Information Theory, Jul. 1972, vol. 18, No. 4, pp. 531-532, IEEE.

Diamant, R., et al., "Choosing the Right Signal: Doppler Shift Estimation for Underwater Acoustic Signals," Proceedings of the Seventh ACM International Conference on Underwater Networks and Systems, Nov. 5, 2012, Article No. 27, pp. 1-8.

Frank, S., et al., "Phase Shift Pulse Codes with Good Periodic Correlation Properties," IRE Transactions on Information Theory, Oct. 1962, vol. 8, No. 6, pp. 381-382, IEEE.

Mao, W., et al., "CAT: High-Precision Acoustic Motion Tracking," MobiCom '16: Proceedings of the 22nd Annual International Conference on Mobile Computing and Networking, Oct. 3, 2016, pp. 69-81.

Sharif, B.S., et al., "A Computationally Efficient Doppler Compensation System for Underwater Acoustic Communications," IEEE Journal of Oceanic Engineering, Jan. 2000, vol. 25, No. 1, pp. 52-61, IEEE.

\* cited by examiner

TABLE I

| Tx duration (ms) | Maximum Likelihood (Diff or regular ZC) | Diff Corr (Diff ZC) | STFT (FMCW) |
|---|---|---|---|
| 120 | 1022 | 54 | 595 |

FIG. 10

TABLE II

| Sequence Length (symbols) | Without Differential | | Proposed Algorithm | |
|---|---|---|---|---|
| | RMSE (mm) | $\sigma^2$ (mm$^2$) | RMSE (mm) | $\sigma^2$ (mm$^2$) |
| 512 | 319.821 | 102380 | 0.7584 | 0.5754 |

FIG. 13

TABLE IIII

| SNR (dB) | Cross-correlation only | | Proposed Algorithm | |
|---|---|---|---|---|
| | RMSE (mm) | $\sigma^2$ (mm$^2$) | RMSE (mm) | $\sigma^2$ (mm$^2$) |
| 20 | 2.1396 | 4.5827 | 0.7466 | 0.5576 |
| 10 | 2.1874 | 4.7900 | 0.7583 | 0.5753 |
| 0 | 2.3756 | 5.6499 | 0.7791 | 0.6074 |
| -10 | 3.6107 | 13.0517 | 0.8432 | 0.7114 |

FIG. 16

TABLE IV

| Length (symbols) | SNR = 20 dB RMSE (mm) | SNR = 10 dB RMSE (mm) | SNR = 0 dB RMSE (mm) | SNR = -10 dB RMSE (mm) |
|---|---|---|---|---|
| 16 | 0.9426 | 0.9444 | 59.32 | 494.9 |
| 32 | 1.3939 | 1.3930 | 40.13 | 871.4 |
| 64 | 0.8728 | 0.8763 | 9.212 | 21.63 |
| 128 | 0.4404 | 0.4411 | 7.809 | 81.64 |
| 256 | 0.8593 | 0.8557 | 0.8521 | 10.03 |
| 512 | 0.7466 | 0.7583 | 0.7791 | 0.8432 |

FIG. 18

HIGH-ACCURACY VELOCITY AND RANGE ESTIMATION OF A MOVING TARGET USING DIFFERENTIAL ZADOFF-CHU CODES

CROSS-REFERENCE TO RELATED APPLICATIONS

This application is a U.S. National Stage Application of International Application No. PCT/IB2020/053630, filed on Apr. 16, 2020, which claims priority to U.S. Provisional Patent Application No. 62/836,879, filed on Apr. 22, 2019, entitled "RANGE ESTIMATION OF A MOVING TARGET USING DIFFERENTIAL ZADOFF-CHU CODES," the disclosures of which are incorporated herein by reference in their entirety.

BACKGROUND

Technical Field

Embodiments of the subject matter disclosed herein generally relate to a system and method for estimating the velocity and range of a moving target, and more particularly, to applying a correlation to Differential Zadoff-Chu codes to estimate the velocity and range of the moving target.

Discussion of the Background

Many modern applications require estimating the range between two devices with a very-high accuracy. These applications include, among others, the navigation, medical care, location-aware networks, video gaming, and virtual reality. Consequently, the range estimation has been studied using different approaches based on ultrasound, radio signal, infrared or lasers to improve its accuracy.

Although algorithms based on infrared or lasers have a high-accuracy, they are complicated and expensive. Radio signal-based range estimation approaches utilizing the received signal strength (RSS) of a Wi-Fi or a Bluetooth signal require pre-calibration and provide low-accuracy. While radio-based ranging methods through time-of-flight (TOF) estimation do not require pre-calibration, they still need an accurate synchronization because small timing errors result in large ranging errors due to the high-speed of light. Approaches based on ultrawideband radio signals have typically a 10-20 cm accuracy. In contrast, ultrasound-based methods are of low-cost and have a high-accuracy in estimating the TOF signal because of the low propagation speed of the ultrasound signals. However, the ultrasound range estimation of a moving target is affected by the transmitted signal power, and the relative velocity between the transmitter and the receiver.

Various range estimation methods have been proposed in the literature. Although RSS-based ranging algorithms are generally simple compared to the other algorithms, they suffer from low-accuracy issues. Phase-shift-based ranging using a single frequency signal has a high-accuracy, but is limited to distances less than one wavelength of the signal carrier. Using multiple frequencies allows for estimating longer distances by calculating the phase differences between the various frequencies, using a narrowband multi-frequency continuous wave (MFCW) ultrasound signal. Nevertheless, the frequency difference, $\Delta f$, in the MFCW restricts the estimated range to $c=\Delta f$, where c is the speed of sound.

Furthermore, range estimation based on narrowband signals is very sensitive to noise, multipath, and interference. As a result, a number of range estimation systems utilizing wideband signals have been proposed to estimate the TOF and to diminish the limitations of narrowband signals.

In the basic TOF-based ranging systems, the peak location of the cross-correlation between the transmitted signal and the received signal provides an estimate of the TOF, assuming that the transmitter and the receiver are synchronized. Sharing the same clock between the transmitter and the receiver is one of the ways to achieve synchronization. Multiplying the TOF by the propagation speed of the signal determines the range between the transmitter and the receiver. The correlation properties of the transmitted signal highly affect the accuracy of the estimated TOF.

In this regard, the Zadoff-Chu sequences have good correlation properties and therefore, they are widely used for synchronization purposes. In previous work by the inventors [1], a high-accuracy TOF-based ranging system has been implemented utilizing a Zadoff-Chu-coded ultrasound signal. However, with a moving transmitter or receiver, the Doppler shifts severely degrade the range estimation accuracy, especially for high-speed moving devices and/or long sequences.

The range estimation of a moving target can also be achieved by transmitting sine waves at multiple frequencies, followed by a frequency modulated continuous waves (FMCW), as discussed in [2]. The fast Fourier transforms (FFT) of the sine waves are utilized to determine the velocity of the moving target and the FFT of the FMCW is used to estimate the range of the target. The downside of this approach is that it assumes a constant velocity over the duration of the transmitted signal, which limits its application to targets with low-acceleration.

Under the low-acceleration assumption, the joint maximum likelihood (ML) estimation of the target velocity and range achieves very high-accuracy. However, the ML approach performs a two-dimensional search, which has a high computational complexity, as will be discussed later. Furthermore, if the target has a high-acceleration, then an additional search dimension is required to consider the acceleration of the target.

Thus, there is a need for a method that is capable of calculating the range of a moving target with a high-accuracy and without suffering from one or more of the limitations noted above with regard to the existing methods.

BRIEF SUMMARY OF THE INVENTION

According to an embodiment, there is a method for estimating a range of a moving target. The method includes emitting, from a target, a first ultrasound signal T, wherein the first ultrasound signal T is generated based on a first differential Zadoff-Chu sequence x; receiving, at a receiver, a second ultrasound signal R, which corresponds to the first ultrasound signal T, wherein the second ultrasound signal R includes a second differential Zadoff-Chu sequence y; correlating the first ultrasound signal T with the second ultrasound signal R to calculate an initial time of flight estimate $\hat{\tau}_{corr}$; and calculating an initial range estimate $\hat{d}_{corr}$ by multiplying the initial time of flight estimate $\hat{\tau}_{corr}$ with a speed of sound c. A differential Zadoff-Chu sequence is different from a Zadoff-Chu sequence.

According to another embodiment, there is a system for estimating a range of a moving target, and the system includes the target, which is configured to emit a first ultrasound signal T, wherein the first ultrasound signal T is generated based on a first differential Zadoff-Chu sequence x; a receiver configured to receive a second ultrasound signal R, which corresponds to the first ultrasound signal T, wherein the second ultrasound signal R includes a second differential Zadoff-Chu sequence y; and a computing device connected to the receiver and configured to correlate the first ultrasound signal T with the second ultrasound signal R to calculate an initial time of flight estimate $\hat{\tau}_{corr}$, and calculate an initial range estimate $\hat{d}_{corr}$ by multiplying the initial time of flight estimate $\hat{\tau}_{corr}$ with a speed of sound. A differential Zadoff-Chu sequence is different from a Zadoff-Chu sequence.

According to another embodiment, there is a system for generating a coded ultrasound signal, and the system includes a target, which is configured to emit a first ultrasound signal T, wherein the first ultrasound signal T is generated based on a first differential Zadoff-Chu sequence x; and a receiver configured to receive a second ultrasound signal R, which corresponds to the first ultrasound signal T, wherein the second ultrasound signal R includes a second differential Zadoff-Chu sequence y. A differential Zadoff-Chu sequence is different from a Zadoff-Chu sequence.

BRIEF DESCRIPTION OF THE DRAWINGS

For a more complete understanding of the present invention, reference is now made to the following descriptions taken in conjunction with the accompanying drawings, in which:

FIG. 10 illustrates the running time for four ranging algorithms;

FIG. 13 illustrates the estimated range and variance for the moving transmitter;

FIG. 16 illustrates the RMSE and variance of the range estimates for a moving transmitter;

FIG. 18 illustrates the range estimate RMSE using the novel algorithm;

DETAILED DESCRIPTION OF THE INVENTION

Figure 1:
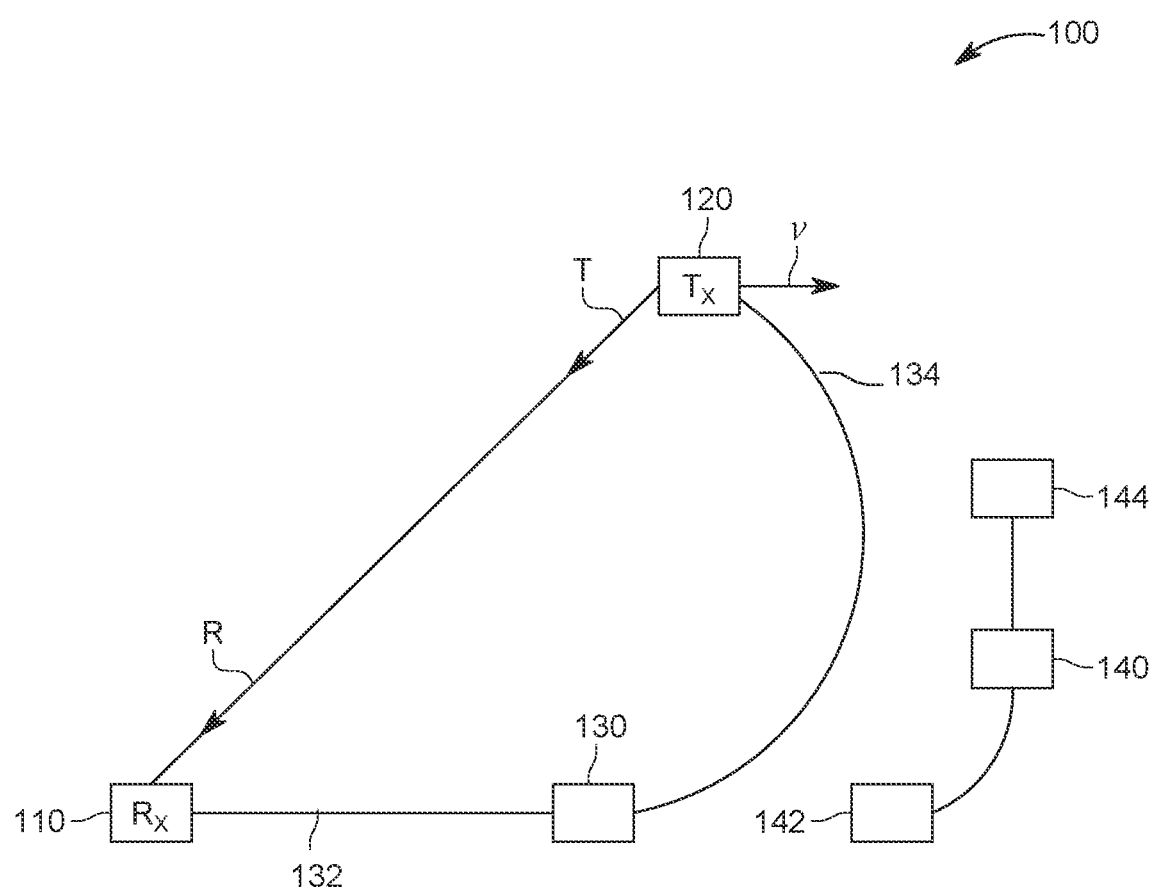
FIG. 1 is a schematic diagram of a system for determining a range of a moving target.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a system that uses a single transmitter and a single receiver for determining the range of the moving transmitter. The transmitter may be associated with any object. However, the embodiments to be discussed next are not limited to such a system, but they may be applied to a system that includes plural transmitters and/or receivers.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a high-accuracy range estimation method is presented and the method uses a novel signal design that uses codes that are called herein differential Zadoff-Chu (DZC) codes or sequence. Due to the Doppler shifts, the DZC codes improve the performance of the ML-based range estimation compared to its performance when using regular ZC codes or sequences of codes. Moreover, a reduced-complexity ranging algorithm is proposed utilizing DZC sequences, and this algorithm outperforms the regular ZC ML-based range estimation algorithm discussed in [1]. The proposed method is implemented in an actual system in a typical indoor environment using a low-cost ultrasound hardware. Under a low signal-to-noise ratio (−10 dB SNR), more than 90% of the range estimates have an error of less than 1.6 mm, with a movement range from 0.2 m to 2.2 m. For the same movement range, the system provides range estimates with a root mean square error (RMSE) less than 0.76 mm and a variance less than 0.57 mm$^2$ in a high SNR scenario (10 dB).

Before discussing the novel DZC sequences, the Zadoff-Chu (ZC) sequences discussed in [1] are introduced. The ZC sequences are polyphase complex valued sequences, and were introduced in [3] and [4]. These sequences have a constant amplitude and the zero auto-correlation (CAZAC) property, which allows them to provide high-accuracy TOF-based range estimation of a static target using cross-correlation, as discussed in [1]. However, the presence of the random Doppler shifts, due to the movement of the target, tends to break the CAZAC property of the ZC sequences, especially for long sequences and/or high-velocity moving targets as now discussed.

When Doppler shifts are present (called herein the Doppler condition) due to the movement of the target, the signal received from the target, which is called herein the received signal y(t), can be modeled as discussed in [5], $$y(t)=\alpha(t)x(t-\kappa)e^{i(\theta+2\pi v(t)t)}+n(t), \quad (1)$$

where x(t) is the transmitted signal, α(t) is the attenuation factor, κ is the TOF, θ is the overall phase shift encountered by the carrier, v(t) is the Doppler shift at time t, and n(t) is an additive Gaussian noise with zero mean and variance $\sigma^2$. FIG. 1 shows a system 100 that includes a receiver 110 and a transmitter 120, i.e., the target. The system may optionally include a computing device 130 that processes the information received by the receiver 110 from the transmitter 120. The computing device 130 may communicate in a wired or wireless way with the receiver 110, for example, along communication link 132. The computing device 130 may also communicate with the target (which is symbolically illustrated in the figure by communication link 134) and know what signal the target will transmit. For experimental purposes, for testing this system, a tracking system 140 having cameras 142 and 144 may be used, as discussed later. The transmitter 120 emits the ZC sequences T, which are mathematically described by x(t), which are then received as signal R at the receiver 110, and the received signal R is recorded at the receiver 110 as sequence y(t). The complex envelope $y_e(t)$ of the received signal y(t) can be obtained using an IQ demodulator.

The discrete-time version of the complex envelope $y_e(t)$ of the received signal y(t), obtained by sampling $y_e(t)$ at sampling period $T_s$, is given by $$y_e[k] = h[k]x_e[k-\tau] + n[k] \quad (2)$$
$$= a[k]x_e[k-\tau]e^{i(\theta+2\pi v[k]k)} + n[k],$$

where $h[k]=\alpha[k]e^{i2\pi v[k]k}$ is the channel response at discrete time k under Doppler condition, $x_e[k]$ is the discrete-time complex envelope of the transmitted signal, τ is the TOF normalized by $T_s$ and rounded to the nearest integer, v[k] is the discrete-time normalized Doppler shift, and n[k] is the discrete-time complex additive Gaussian noise with zero mean and variance $\sigma^2$.

The transmitted signal x(t) is composed of repetitions of a sequence of length N. The change in the attenuation factor α[k] over the sequence's duration is assumed to be negligible. Therefore, it can be assumed that $\alpha[k]=\alpha_B$ for k=0, 1, . . . , N−1.

Let the complex envelope $x_e[k]$ of the transmitted signal be a ZC sequence of length N, which is given by $$x_e[k]=e^{i\phi_R[k]}, \quad (3)$$

where $\phi_R[k]$ is given by:

$$\phi_R[k] = \begin{cases} \dfrac{M\pi}{N}k(k+1), & \text{if } N \text{ is odd} \\ \dfrac{M\pi k^2}{N}, & \text{if } N \text{ is even} \end{cases} \quad (4)$$

and 0<M<N is coprime with N. Here it is assumed that the symbols of the ZC sequence are transmitted according to the sampling rate $f_s=1/T_s$. However, considering a different higher transmission rate does not affect the derivations discussed next.

It can be shown that in a noiseless case, and under a fixed normalized Doppler shift v over the duration of the sequence, the magnitude of a cross-correlation r[n], between the complex envelope of the transmitted and received signals is given by:

$$|r[n]| \triangleq \left|\sum_{k=0}^{N-1} x_e^*[k]y_e[k+n]\right| \quad (5)$$

$$= |\alpha_B|\left|\frac{e^{-i2\pi M(\tau-n-\frac{Nv}{M})}-1}{e^{-i2\pi\frac{M}{N}(\tau-n-\frac{Nv}{M})}-1}\right|$$

$$= |\alpha_B|\frac{\sin\left(\pi M\left(\tau-n-\frac{Nv}{M}\right)\right)}{\sin\left(\pi\frac{M}{N}\left(\tau-n-\frac{Nv}{M}\right)\right)}, n = 0, 1, \ldots, N-1.$$

The magnitude of the cross-correlation function r[n] has a peak whenever both the numerator and the denominator are zeros, which depends on the TOF τ and the Doppler shift v. Therefore, the location of the peak does not give the true TOF c except when v is zero. When v is not zero, the location of the cross-correlation peak is shifted proportionally to the value of v.

Differential Zadoff-Chu Codes and their Properties

To mitigate the influence of the Doppler shifts on the TOF values and to improve the range estimation accuracy, according to an embodiment, a new code α[k], called herein Differential ZC (DZC), is defined as:

$$a[k] = e^{i\phi_D[k]}, k = 0, 1, \ldots, N-1 \quad (6)$$

where $$\phi_D[k] = \begin{cases} \dfrac{\pi M}{3N}k(k+1)(k-1), & \text{for odd } N \\ \dfrac{\pi M}{3N}k\left(k-\dfrac{1}{2}\right)(k-1), & \text{for even } N \end{cases} \quad (7)$$

and 0<M<N is coprime with N. The DZC sequences are periodic, with a period of N if N is odd and not divisible by 3, 3N if N is odd and divisible by 3, 4N if N is even and either (2N−1) or (N−1) is divisible by 3, and 12N otherwise. This property of the DZC codes will be useful when applied to the ML estimator, as discussed later.

The DZC sequences have two properties. According to the first property, for any DZC sequence of length N, the DZC sequence provides a better range estimation accuracy when compared to the regular ZC sequence. Moreover, according to the second property, under the assumption of the high-symbol rate, the DZC sequences almost preserve the CAZAC property even in the presence of random Doppler shifts.

To illustrate the first property of the DZC sequences, the Cramer-Rao Lower bound (CRLB) is used for estimating the range and velocity of a moving target for regular and differential ZC sequences. The CRLB is a lower bound on the variance of any unbiased estimator and hence serves as a benchmark. For the second property, a differential sliding correlation function is used, which shows that under a high-symbol rate, the DZC sequences almost preserve the CAZAC property, even if there are random Doppler shifts.

The CRLB is given by $$C(\tau,v,\theta) \geq I(\tau,v,\theta)^{-1}, \quad (8)$$

where C(τ,v,θ) is the covariance matrix and I(τ,v,θ) is the Fisher Information Matrix (FIM). The CRLB for the estimates of the unknown parameters are determined by the diagonal elements of the inverse of the FIM evaluated at the true parameter value. The CRLBs can be written as:

$$\text{var}(\hat{\tau}) \geq [I^{-1}(\tau, v, \theta)]_{1,1} \quad (9)$$

$$\text{var}(\hat{v}) \geq [I^{-1}(\tau, v, \theta)]_{2,2} \quad (10).$$

For the ZC sequences, the 3-by-3 FIM is singular and the computation of the pseudo-inverse matrix is complicated. Therefore, it is assumed in this embodiment that θ is known and only c and v need to be estimated. The CRLB always increases as we estimate more parameters. Hence, when we assume θ is known, the obtained lower bounds are still valid. For a large odd N, the CRLBs for the ZC sequences are given by:

$$\text{var}(\hat{\tau}) \geq \frac{2\sigma^2 N}{\pi^2 M^2 (2\tau - 1)^2}, \quad (11)$$

$$\text{var}(\hat{v}) \geq \frac{6\sigma^2 [2\tau - 1]^2 - 2(2\tau - 1)N + \left(\frac{4}{3}\right)N^2]}{N^3 (2\tau - 1)^2}. \quad (12)$$

In the case of the DZC sequences, the 3-by-3 FIM is nonsingular and thus, the CRLBs for the DZC are given by equations:

$$\text{var}(\hat{\tau}) \geq \frac{90N\sigma^2}{\pi^2 M^2 (4 - 5N^2 + N^4)}, \quad (13)$$

$$\text{var}(\hat{v}) \geq \frac{3\sigma^2 [11 + 60\tau(\tau + 1) - 30N - 60\tau N + 16N^2]}{2\pi^2 N (4 - 5N^2 + N^4)}. \quad (14)$$

Figure 2:
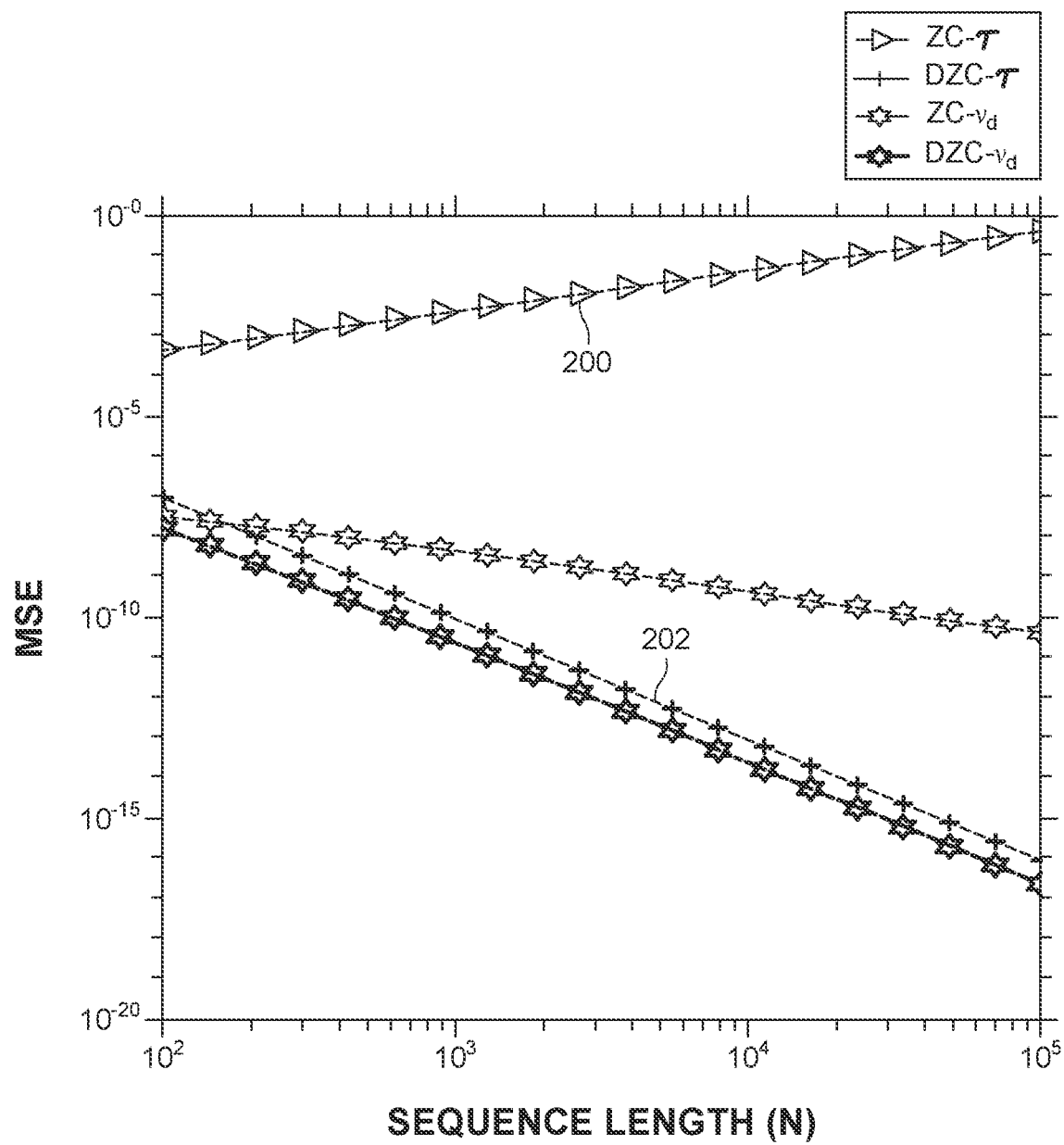
FIG. 2 illustrates the mean square error (MSE) of the Cramer-Rao Lower bound for various sequences.

The CRLB for estimating the TOF τ using the ZC sequences grows as O(N), as shown by curve 200 in FIG. 2, while for the DZC sequences it decays as O(N$^{-3}$), as shown by curve 202, which means that the DZC sequences can achieve a lower bound than the ZC sequences. FIG. 2 plots the mean square error (MSE) versus the sequence length for the ZC and DZC sequences, for the TOF τ and Doppler shift v. Therefore, the performance of the TOF estimator can be improved using the DZC sequences compared to its performance using the regular ZC sequences. The extension of the CRLBs derivations even to lengthy sequences is immediate. These facts support the first property of the DZC sequences, i.e., for any code length N, the DZC sequences provide better ranging accuracy of a moving target compared to the regular ZC sequences.

The second property of the DZC sequences, i.e., the DZC sequences maintain the CAZAC property even with Doppler shifts, is now discussed. A differential sliding correlation function is defined as:

$$r_D[n] = \sum_{k=0}^{N-1} x_e^*[k] x_e[k+m] y_e[k+n] y_e^*[k+m+n] \quad (15)$$

for n=0, 1, . . . , N−1, where n is the differential correlation step. In this embodiment, a circular differential sliding correlation is applied, where $y_e[n+N]=y_e[n]$. The complex envelope of the received signal is cut into frames, each of length N. The differentially decoded frame at instant k is obtained by multiplying the frame at instant k with the convolution of the frame that starts at k+m.

DZC sequences are designed such that for any differential correlation step m, the product $x_e^*[k]x_e[k+m]$ is a regular ZC sequence. Therefore, this embodiment correlates the differentially received samples with a regular ZC sequence. Consider an odd-length DZC sequence. In the noiseless case and with m=1, using Equations (2) and (7), it is possible to rewrite the equation (15) as $$r_D[n] = \sum_{k=0}^{N-1} h^*[k] h[k+1] e^{i\frac{\pi M}{N} k(k+1)} e^{-i\frac{\pi M}{N}(k-\tau+n)(k-\tau+n+1)}. \quad (16)$$

Under the high-symbol rate, it can be assumed that $h[k] \approx h[k+1]$, because for practical Doppler shifts, the channel will not change too much between two consecutive samples and thus, $h^*[k]h[k+1] \approx \alpha_B^2$, for any integer k. Therefore, the differential sliding correlation function $r_D$ becomes:

$$|r_D[n]| = \sum_{k=0}^{N-1} \alpha_B^2 e^{i\frac{\pi M}{N} k(k+1)} e^{-i\frac{\pi M}{N}(k-\tau+n)(k-\tau+n+1)} = \quad (17)$$

$$\alpha_B^2 e^{-i\frac{\pi M}{N}(\tau-n)(\tau-n+1)} \sum_{k=0}^{N-1} e^{-i\frac{\pi M}{N}(\tau-n)} = \alpha_B^2 e^{-i\frac{\pi M}{N}(\tau-n)(\tau-n+1)} \frac{e^{-i2\pi M(\tau-n)} - 1}{e^{-i\frac{\pi M}{N}(\tau-n)} - 1}.$$

Taking the absolute value of equation (17) yields the following result:

$$|r_D[k]| = \begin{cases} 0, & \text{if } n \neq \tau \\ |\alpha_B^2|N, & \text{if } n = \tau \end{cases}. \quad (18)$$

Similarly, it is possible to show that an even-length DZC sequence has a differential sliding correlation also given by equation (18). Equation (18) shows that the proposed DZC sequence maintains the CAZAC property even under random Doppler shifts.

Next, an unbiased estimator that achieves the CRLB is discussed and such an estimator is called a minimum-variance unbiased estimator (MVUE). A maximum likelihood (ML) estimator is used to provide a benchmark as it achieves the CRLB in the high SNR regime. Then, a low-complexity algorithm is derived based on DZC sequences. While it has an inferior performance when compared to the ML, it still outperforms the ML estimator applied on the ZC. A refinement algorithm based on the phase shift estimation to compensate for the loss with respect to the performance of the ML estimator is then introduced.

The Maximum Likelihood Estimator

The probability p of observing the received sequence y (regular ZC or DZC) is given by:

$$p(y \mid \tau, \theta, v) = \prod_{k=0}^{N-1} p(y_e[k] \mid \tau, \theta, v) = \quad (19)$$

$$\frac{1}{(\pi\sigma^2)^N} \exp\left\{-\frac{1}{\sigma^2} \sum_{k=0}^{N-1} |y_e[k] - x_e[k-\tau] e^{j(\theta+2\pi v k)}|^2\right\}$$

where τ is the time of flight, θ is the phase discussed with regard to equation (5), and v is the Doppler shift.

The phase $\theta$ changes too much from one measurement to the other and generally a precise priori knowledge about it cannot be obtained or even processed easily. Thus, in this embodiment, it is assumed the worst case scenario of a uniform distribution over $[0, 2\pi)$ for the phase $\theta$. Averaging over the phase $\theta$ will enable to focus only on c and v. With these simplifications, equation (19) becomes, after averaging:

$$p(y \mid \tau, v) = \int_0^{2\pi} p(y \mid \tau, \theta, v) p(\theta) d\theta = \qquad (20)$$

$$\int_0^{2\pi} \frac{1}{2\pi(\pi\sigma^2)^N} \exp\left\{-\frac{1}{\sigma^2} \sum_{k=0}^{N-1} |y_e[k] - x_e[k-\tau]e^{j\theta}e^{j2\pi vk}|^2\right\} d\theta.$$

By expanding the term inside the summation in equation (20), the likelihood function can be rewritten as:

$$p(y \mid \tau, v) = \frac{1}{2\pi(\pi\sigma^2)^N} \exp\left\{-\frac{1}{\sigma^2} \sum_{k=0}^{N-1} |y_e[k]|^2 + |x_e[k-\tau]|^2\right\} \qquad (21)$$

$$\int_0^{2\pi} \exp\left\{\frac{1}{\sigma^2} \sum_{k=0}^{N-1} 2\Re\{y_e^*[k] x_e[k-\tau]e^{j\theta}e^{j2\pi vk}\}\right\} d\theta =$$

$$c_\pi e^{\eta(\tau)} \int_0^{2\pi} \exp\left\{\frac{1}{\sigma^2}\left((\xi(\tau, v))e^{j\theta} + \xi^*(\tau, v)e^{-j\theta}\right)\right\} d\theta,$$

where $$c_\pi = \frac{1}{2\pi(\pi\sigma^2)^N}, \qquad (22)$$

$$\zeta(\tau, v) = \sum_{k=0}^{N-1} y_e^*[k] x_e[k-\tau]e^{j2\pi vk}, \text{ and} \qquad (23)$$

$$\eta(\tau) = -\frac{1}{\sigma^2} \sum_{k=0}^{N-1} |y_e[k]|^2 + |x_e[k-\tau]|^2. \qquad (24)$$

Equation (20) can be rewritten as:

$$p(y \mid \tau, v) = c_\pi e^{\eta(\tau)} \int_0^{2\pi} \exp\left\{\frac{2}{\sigma^2}(|\xi(\tau,v)|\cos(\theta) + \angle\xi(\tau,v))\right\} d\theta = \qquad (25)$$

$$c_\pi e^{\eta(\tau)} \int_0^{2\pi} \exp\left\{\frac{2}{\sigma^2}|\xi(\tau,v)|\cos(\theta)\right\} d\theta$$

$$= 2\pi c_\pi e^{\eta(\tau)}\left[I_0\left(\frac{2|\zeta(\tau,v)|}{\sigma^2}\right)\right], \qquad (26)$$

where equation (25) follows from the fact that the added angle $\angle\xi(\tau,v)$ has no effect on the integration of the cosine over its period. In equation (26), $I_0(\cdot)$ is the modified Bessel function of the first kind and zero order. For large argument values (e.g., z), the modified Bessel function can be approximated as:

$$I_0(z) = \frac{e^z}{\sqrt{2\pi z}}. \qquad (27)$$

Therefore, under a high SNR scenario, the likelihood function given by equation (26) can be approximated by:

$$p(y \mid \tau, v) \approx 2\pi c_\pi e^{\eta(\tau)} \frac{\exp\left\{\frac{2|\xi(\tau,v)|}{\sigma^2}\right\}}{\sqrt{\frac{4\pi|\xi(\tau,v)|}{\sigma^2}}}. \qquad (28)$$

Maximizing the likelihood function given by the equation (28), is equivalent to maximizing the log-likelihood function, which up to a constant is given by:

$$\ln p(y \mid \tau, v) \approx \frac{-1}{\sigma^2} \sum_{k=0}^{N-1} |y_e[k]|^2 + |x_e[k-\tau]|^2 + \qquad (29)$$

$$\frac{2}{\sigma^2}\left|\sum_{k=0}^{N-1} y_e^*[k] x_e[k-\tau]e^{j2\pi vk}\right| - \frac{1}{2}\ln\left(\frac{\left|\sum_{k=0}^{N-1} y_e^*[k] x_e[k-\tau]e^{j2\pi vk}\right|}{\sigma^2}\right),$$

where $c_\pi$, $\eta(\tau)$, and $\xi(\tau,v)$ were replaced by their expressions given by equations (22) to (24). In the high SNR scenario, the last term in equation (29) is negligible and the log-likelihood function reduces to:

$$\ln p(y \mid \tau, v) \approx \qquad (30)$$

$$\frac{-1}{\sigma^2} \sum_{k=0}^{N-1} |y_e[k]|^2 + |x_e[k-\tau]|^2 + \frac{2}{\sigma^2}\left|\sum_{k=0}^{N-1} y_e^*[k] x_e[k-\tau]e^{j2\pi vk}\right|.$$

Because the signal itself has a constant amplitude and does not affect the maximization, maximizing the log-likelihood function can be achieved by maximizing the following metric:

$$\hat{\tau}_{ML}, \hat{v}_{ML} = \underset{\tilde{\tau},\tilde{v}}{\mathrm{argmax}} M_{\tilde{\tau},\tilde{v}} \qquad (31)$$

where $$M_{\tilde{\tau},\tilde{v}} = \left|\sum_{k=0}^{N-1} y_e[k] x_e^*[k-\tilde{\tau}]e^{-j2\pi\tilde{v}k}\right| \qquad (32)$$

and the symbol $\tilde{\phantom{x}}$ indicates a hypothetical element.

The metric in equation (32) is known in pulsed radar and sonar signal processing as the "ambiguity function" because it might have several maxima, which causes an ambiguity in estimating $\tau$ and v. To illustrate this ambiguity, consider a transmitted odd-length ZC sequence in a noiseless case. Then using Equations (2) and (4), the metric (32) becomes:

$$M_{\tilde{\tau},\tilde{v}} = \left|e^{j\pi\frac{M}{N}(\tau^2 + \tau - \tilde{\tau}^2 - \tilde{\tau})}\right|\left|\sum_{k=0}^{N-1} e^{j2\pi\frac{M}{N}k\left(\tilde{\tau}-\tau+N\frac{v-\tilde{v}}{M}\right)}\right| = \left|\frac{e^{j2\pi M\left(\tilde{\tau}-\tau+N\frac{v-\tilde{v}}{M}\right)} - 1}{e^{j2\pi\frac{M}{N}\left(\tilde{\tau}-\tau+N\frac{v-\tilde{v}}{M}\right)} - 1}\right|, \qquad (33)$$

where $\tau$ and v are the true TOF and true Doppler shift, respectively.

The metric in Equation (33) has a maximum whenever the quantity $$\left(\tilde{\tau} - \tau + N\frac{v-\tilde{v}}{M}\right)$$

is an integer multiple of N. To avoid this ambiguity, in this embodiment, the search over and v is limited to a window that includes a single maximum. Because of the hypothetical TOF $\tilde{\tau} \in [0, N-1]$, the difference between the hypothetical TOF and the true TOF cannot exceed N−1. For this reason, this embodiment estimates the Doppler shift at time i over a window centered at the previous Doppler shift estimate $\tilde{v}_{i-1}$ and has a width equal to M, i.e., $\tilde{v} \in$ $$\left(\tilde{v}_{i-1} - \frac{M}{2} : v_s : \tilde{v}_{i-1} + \frac{M}{2}\right),$$

where the search step $v_s$ is chosen small enough to detect the Doppler shift with a high-accuracy. For this estimation to be accurate, it is necessary to know the initial Doppler shift $v_0$. Also, the current true Doppler shift $v_i$ should not differ from the previous Doppler shift $v_{i-1}$ by more than $$\frac{M}{2}.$$

Assuming the target is initially static, the initial Doppler shift becomes zero. To guarantee that the difference between the current and the previous Doppler shifts is less than $$\frac{M}{2},$$

the periodicity of the DZC sequence is used as now discussed.

Unlike the regular ZC, using the novel DZC sequences removes the ambiguity in estimating the TOF and Doppler shift. To illustrate this advantage of the DZC sequences, consider an odd-length DZC sequence under the noiseless case. Using equations (2) and (7), the metric (32) becomes $$M_{\tilde{\tau},\tilde{v}} = \left|\sum_{k=1}^{N} e^{j2\pi\frac{M}{N}k\left((\tilde{\tau}-\tau)k+(\tilde{\tau}^2-\tau^2)+2N\frac{v-\tilde{v}}{M}\right)}\right|. \tag{34}$$

Figure 3A:
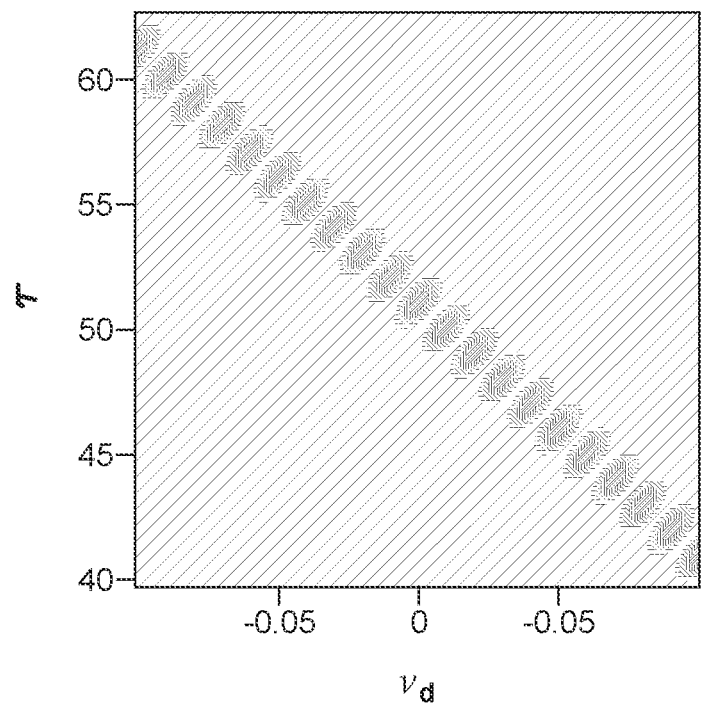
FIGS. 3A and 3B show an ambiguity function for regular Zadoff-Chu codes and differential Zadoff-Chu codes, respectively.
Figure 3B:
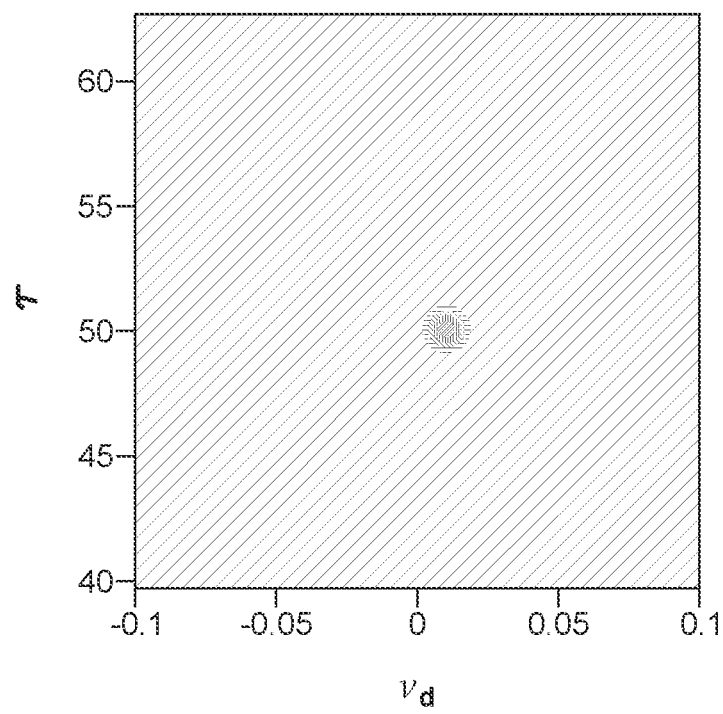

This metric has a maxima that occurs at $\tau = \tilde{\tau}$ when $v - \tilde{v}$ is an integer. Therefore, the ambiguity is removed over $\tau$ and there will be no need for the assumption of a known initial Doppler shift to unambiguously estimate the TOF. Having the time of flight $\tau$, it is possible to calculate an initial range $\hat{d}_{corr}$ of the target, and then to improve this initial range as discussed later. FIG. 3A shows the ambiguity function for the regular ZC sequence and FIG. 3B shows the ambiguity function for the DZC sequence. In these figures, N=101, $\tilde{\tau}$=50 symbols, and v=0.01. The variance of the ML estimator achieves the CRLBs, which makes it an MVUE.

The MVUE has the lowest variance for all possible values of the estimation parameter, but it is computationally expensive. Therefore, according to this embodiment, a reduced complexity range estimation algorithm is introduced and this novel range estimation algorithm, which is illustrated in FIG. 4, is designed to maintain the CAZAC property by utilizing the proposed DZC sequences.

Figure 4:
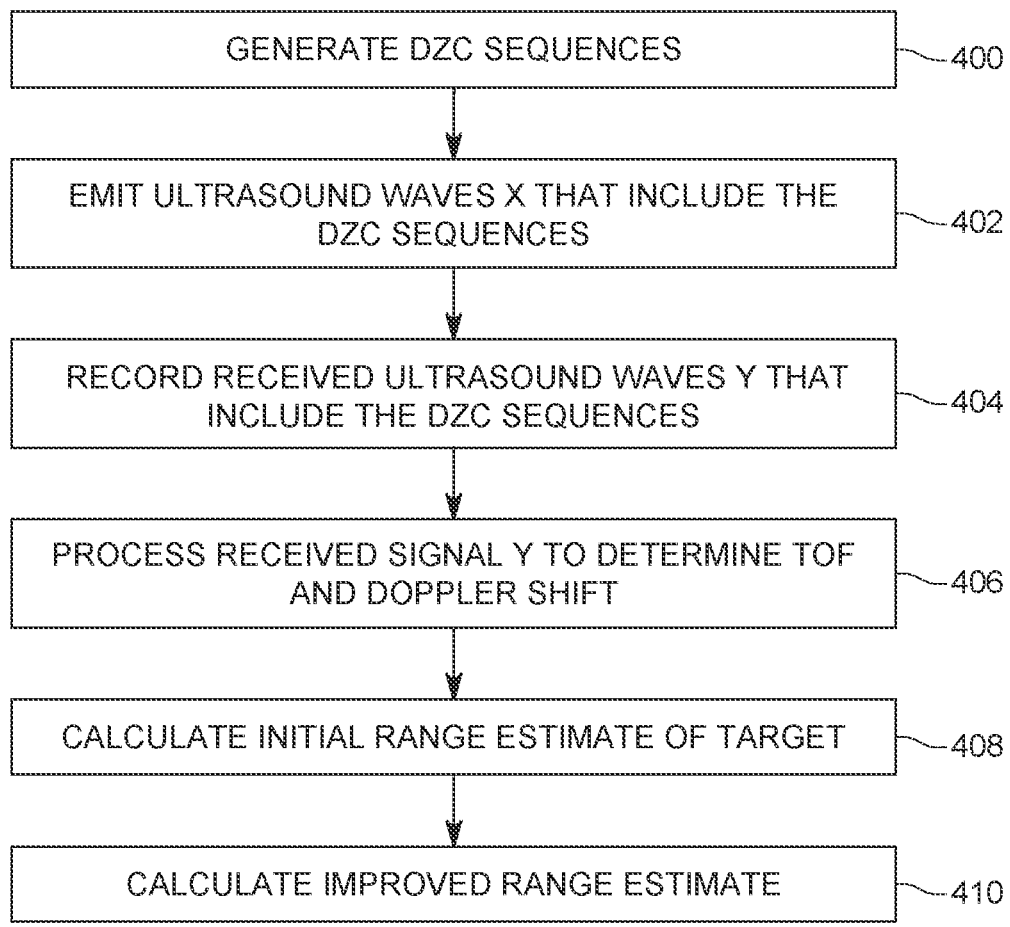
FIG. 4 is a flowchart of a method for calculating the range of a target with the differential Zadoff-Chu codes.
Figure 5:
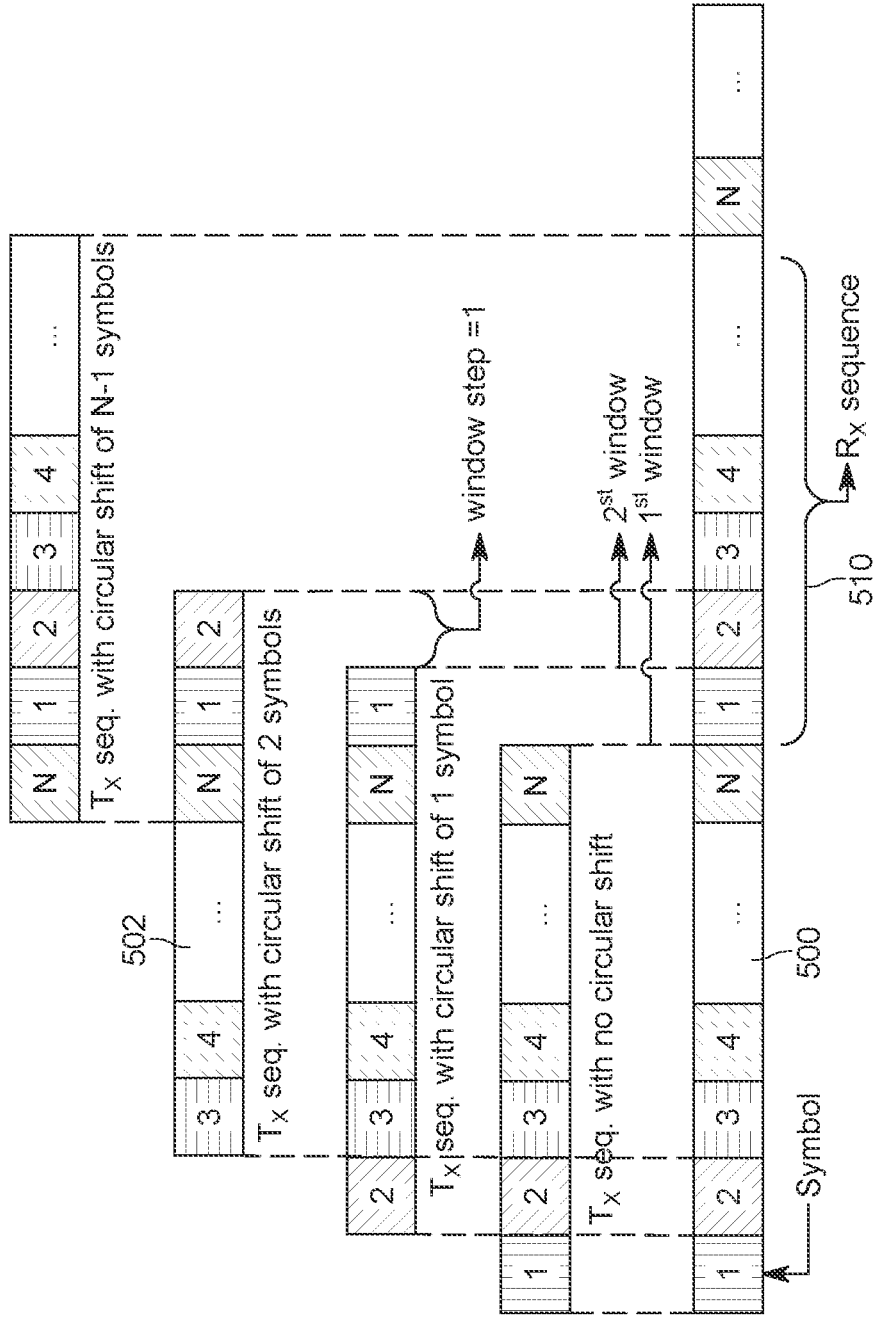
FIG. 5 illustrates the processing of the received sequences.

FIG. 4 shows that in step 400 the DZC sequences are generated. In step 402, ultrasound waves 500 based on the DZC sequences are emitted by the target (i.e., the transmitter 120 in FIG. 1). For repetitive and periodic transmissions 500, the DZC sequence is repeated P times. The received signal y(t), which propagates from the target to the receiver 110, is recorded in step 404. The received signal y(t) is then processed in step 406 using a sliding window with width N, to estimate the TOF and the Doppler shift. The step $w_s$ by which the window is moved determines the update rate $f_u$ of the system, which is the number of estimates per second. Setting the step $w_s$=1 gives the highest possible update rate. FIG. 5 illustrates the transmitted sequence 500, the received sequence 510, and the processing of the received sequences.

Considering the $(i+1)^{th}$ window of the complex envelope of the received signal y(t), by applying a differential sliding correlation between the generated signal x and the received signal y gives $$\tau_D[n] = \sum_{k=0}^{N-1} x_e^*[k]_i x_e[k+m]_i y_e[k+n+i] y_e^*[k+m+n+i], \tag{35}$$

where $x_e[k]_i$ is a circularly shifted version 502 of the transmitted DZC sequence with a phase function $\Phi_D[k]_i = \Phi_D[k+i(\text{mod } N)]$, $y_e[k]$ is the received sequence 510, and N is the period of the sequence. The index $i \in [0, (P-1)(N-1)]$ represents the number of estimates. Therefore, with the circular shift differential sliding correlation of equation (35), each DZC sequence of length N generates N TOF estimates. As was shown in equations (16)-(18), taking the absolute value of the differential sliding correlation $\tau_D$ given by equation (35) results in $$|\tau_D[n]| = \begin{cases} 0, & \text{if } n \neq \tau \\ |a_B|^2 N, & \text{if } n = \tau \end{cases}. \tag{36}$$

Therefore, the location of the maximum of $|\tau_D[n]|$ gives $\hat{\tau}_{corr}$, which is called herein the initial TOF estimate. Multiplying in step 408 the initial TOF estimate by the speed of sound gives the initial range estimate $\hat{d}_{corr}$. The initial range estimates are accurate up to a sample resolution. If the true range is not an integer multiple of the sample resolution, then the fractional range will be rounded to the nearest sample. However, this rounding process may cause errors in estimating the range.

Therefore, in order to achieve a sub-sample resolution and to improve the ranging immunity to noise, it is possible in step 410 to estimate the phase shift between the transmitted and received DZC sequences and use it to refine the initial range estimates to calculated an improved range estimates. The step 410 may include a sub-step of estimating and compensating for the Doppler shifts, and/or a sub-step for estimating the phase shift. These two sub-steps are now discussed in more detail. Note that there is no need to implement both steps. However, it is believed that an algorithm that implements both steps is more advantageous.

The first sub-step, Doppler estimation and compensation, requires to estimate the velocity over segments of the received sequence y(t). The segment length, NS, which is an integer factor of the sequence length N, is chosen such that the change in velocity is negligible over the duration of the segment. The number of range estimates per segment is given by $$L = \frac{N}{N_s}.$$

Differentiating the range gives the instantaneous velocity, and thus it is possible to obtain L velocity estimates per segment. Averaging the velocity estimates and dividing by the speed of sound c gives the relative Doppler shift $\hat{\Delta}$ of that segment.

The frequency offset, caused by the Doppler shift, translates into a time scaling (compression or expansion) of the signal waveform [6] such that $$y(kT_s) = x(k(1+\Delta)T_s), \quad (37)$$

where x(t) and y(t) are the transmitted and the received signal, respectively. If the inverse time scaling is applied to the received signal using the estimated relative Doppler shift $\hat{\Delta}$, it compresses or expands the signal and therefore, removes the frequency offset. This is equivalent to re-sampling the bandpass signal by $1+\hat{\Delta}$, i.e., $$x(kT_s) = y\left(\left(\frac{k}{1+\hat{\Delta}}\right)T_s\right). \quad (38)$$

Figure 6:
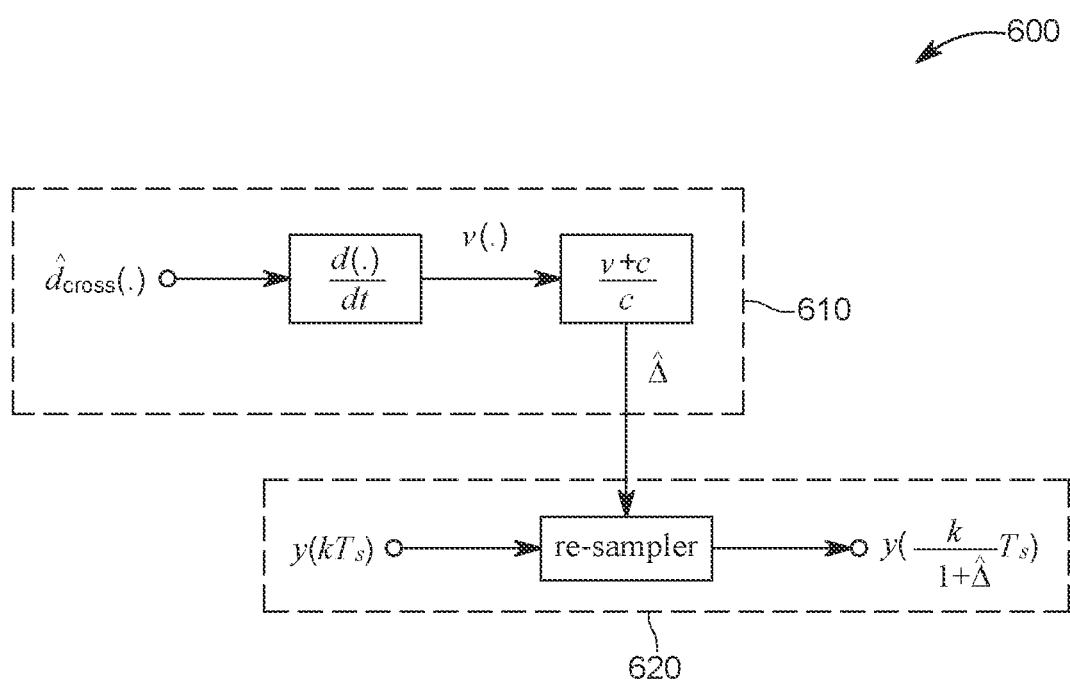
FIG. 6 illustrates a module for frequency offset estimation and compensation.
Figure 7A:
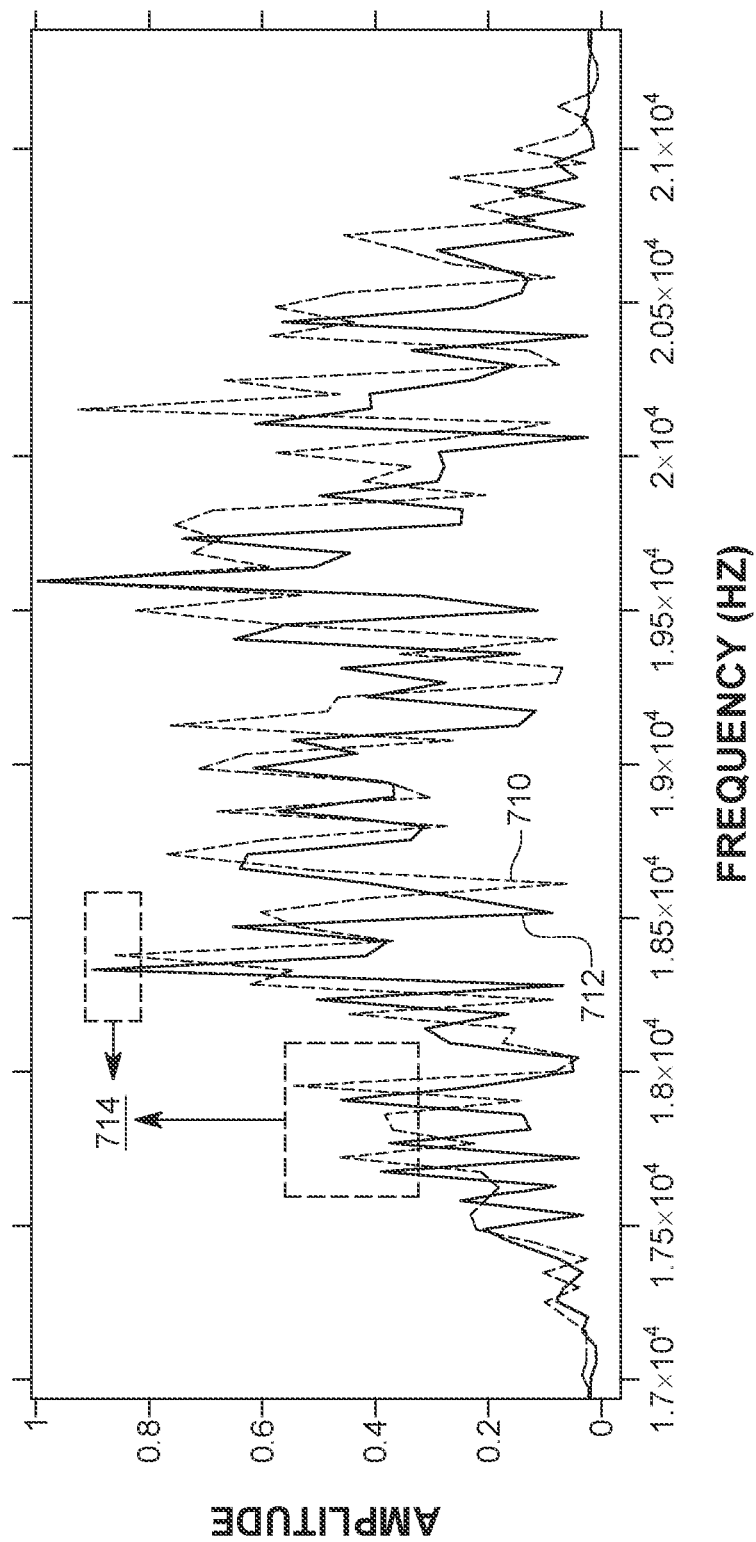
FIGS. 7A and 7B illustrate the spectra for the transmitted and received signals before and after frequency offset compensation.
Figure 7B:
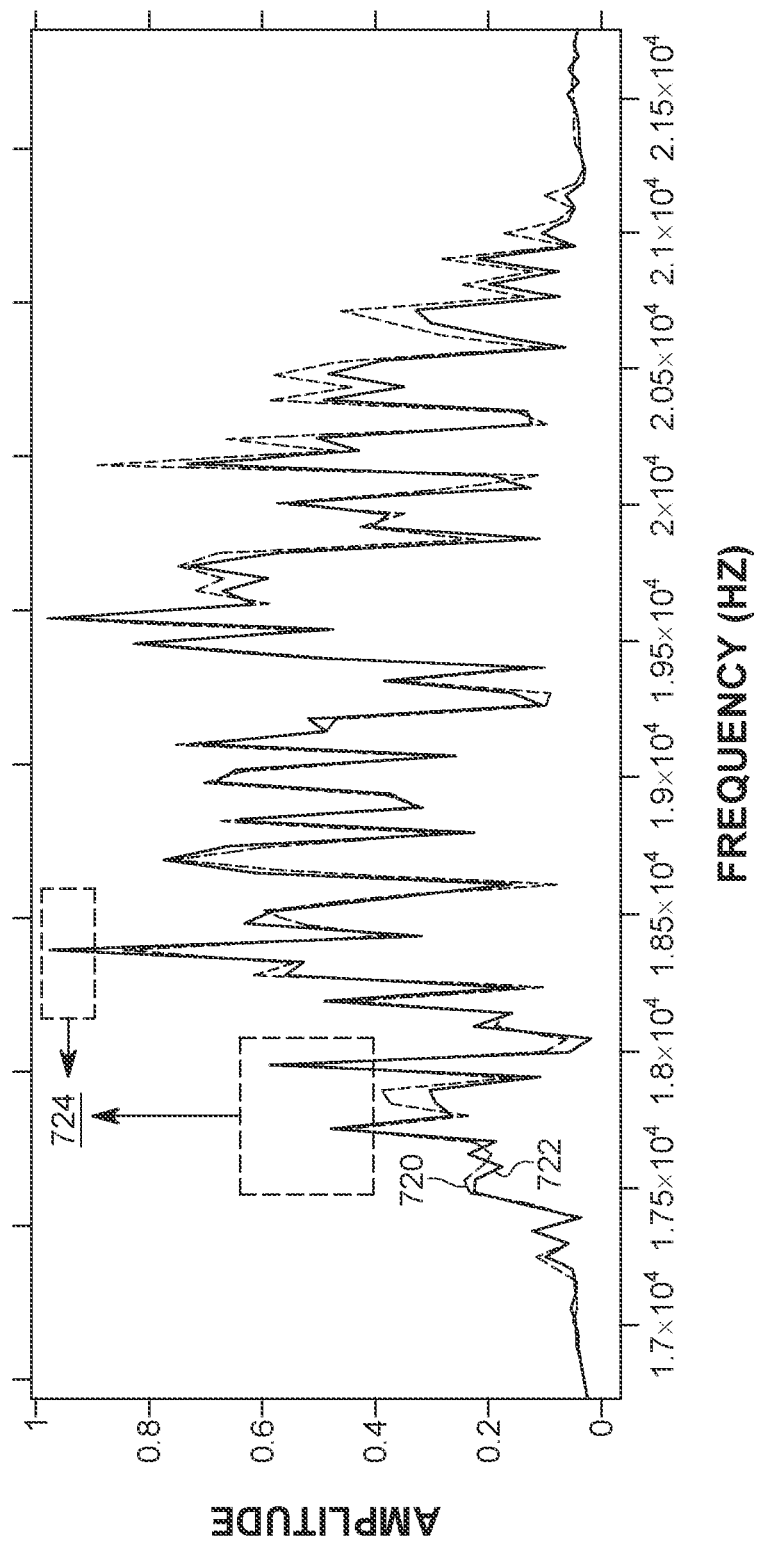

The frequency offset estimation and compensation algorithm 600 is implemented in two steps as shown in FIG. 6. The algorithm estimates in module 610 the relative Doppler shift $\Delta$ using the initial range estimates $\hat{d}_{corr}$, and then the algorithm re-samples in module 620 the segments of the received signal y(t) to the new sampling frequency $f_s' = (1+\hat{\Delta})f_s$. FIG. 7A shows the transmitted signal spectra 710 and the received signal spectra 712 before the frequency offset compensation performed by algorithm 600, and FIG. 7B shows the transmitted signal spectra 720 and the received signal spectra 722 after the frequency offset compensation performed by algorithm 600. Boxes 714 in FIG. 7A show the frequency offsets between the transmitted and received signal spectra while boxes 724 in FIG. 7B shows a nearly complete match between the frequencies of the transmitted and received signal spectra.

The second sub-step, the phase shift estimation, if performed, is implemented after correcting the frequency offset of the received signal in the first sub-step. In this embodiment, it is possible to refine the initial range estimates $\hat{d}_{corr}$ to a sub-sample resolution by estimating the phase shift between the transmitted and the corrected received signal.

Let the discrete-time version of the received signal after Doppler compensation be:

$$y[k] = x\left[k - \left\lfloor \frac{d}{c} \right\rfloor\right] + n[k], \quad (39)$$

where $\lfloor \cdot \rfloor$ denotes the operation of rounding to the nearest integer. The circularly shifted version of the transmitted signal x with a circular shift of $$\left\lfloor \frac{\hat{d}_{corr}}{c} \right\rfloor$$

is given by $$z[k] = x\left[k - \left\lfloor \frac{\hat{d}_{corr}}{c} \right\rfloor\right]. \quad (40)$$

The phase shift between the received signal y[k] and the circularly shifted transmission signal z[k] at the $m^{th}$ frequency bin $\omega_m$ is given by $$\hat{\phi}_m = ang(Z(\omega_m)Y^*(\omega_m)) \quad (41)$$
$$= \omega_m \tau_\phi + \epsilon_m$$

where $Z(\omega)$ and $Y(\omega)$ are the discrete Fourier transforms of z[k] and y[k], respectively, "*" denotes the complex conjugation operation, $\tau_\phi$ is the sub-sample delay, and $\epsilon_m$ is the error in the estimated phase due to the noise (see [7]). Dividing the estimated phase shift $\hat{\phi}_m$ by the associated frequency bin $\omega_m$ and multiplying the result by the speed of sound c gives the estimated range refinement $\hat{\Delta}d_m$.

Because the DZC sequences have frequencies that vary with time, it is required to estimate the phase shift associated with each of these frequencies. Therefore, the valid frequency bins of the received signal are determined based on a particular threshold value. This value is decided experimentally, in one application, to be 0.5 of the maximum of $Z(\omega)$. Other values may be selected. All frequency bins that have components higher than this threshold are considered valid frequencies. The estimated range refinement $\hat{\Delta}d$ is the average of $\hat{\Delta}d_m$ for all valid frequency bins, i.e., $$\hat{\Delta}d = \frac{\sum_{m=0}^{P-1} \hat{\Delta}d_m}{P}, \quad (42)$$

where P is the number of the valid frequency bins. The refined range $\hat{d}$ is given by $$\hat{d} = \hat{d}_{corr} + \hat{\Delta}d. \quad (43)$$

Next, a Minimum Refinement Variance Search is performed because the phase information is limited to $\pm\pi$. Thus, the range refinement $\Delta d$ is confined to one wavelength of the transmitted signal. Therefore, the phase shift algorithm fails when the absolute value of the error is larger than $\lambda_{max}/2$, where $\lambda_{max}$ is the maximum wavelength of the signal, which might happen in low SNR scenarios. To correct the initial range estimates to within one wavelength, a minimum refinement variance search algorithm is applied. This algorithm calculates the variance in the estimated refinement $\hat{\Delta}d_m$ over the valid frequency bins, at different range candidates.

More specifically, in one embodiment, $z_i[k]$ is the circularly shifted version of z[k], where the index i represents the amount by which the z[k] is shifted. Each circular shift of z[k] represents a range candidate, where the range candidate associated with zero cyclic shift is $\hat{d}_{corr}$. Using $z_i[k]$ instead of z[k] in equations (39)-(42) gives the estimated range refinement $\hat{\Delta}d_i$ for each range candidate. The refinement variance $V_i$ associated with the $i^{th}$ range candidate is given by $$V_i = \frac{\sum_{m=0}^{P-1}(\hat{\Delta}d_i - \hat{\Delta}d_m)^2}{P}. \quad (44)$$

When the absolute difference $|d-\hat{d}_{corr}|$ is less than $\lambda_{max}/2$, the estimated range refinements $\hat{\Delta}d_m$ will be consistent over all the valid frequency bins, which results in a low variance $V_i$. In contrast, when the difference $|d-\hat{d}_{corr}|$ is larger than $\lambda_{max}/2$, the estimated range refinements $\hat{\Delta}d_m$ will fluctuate over the valid frequency bins, which produces high variance $V_i$.

Figure 8:
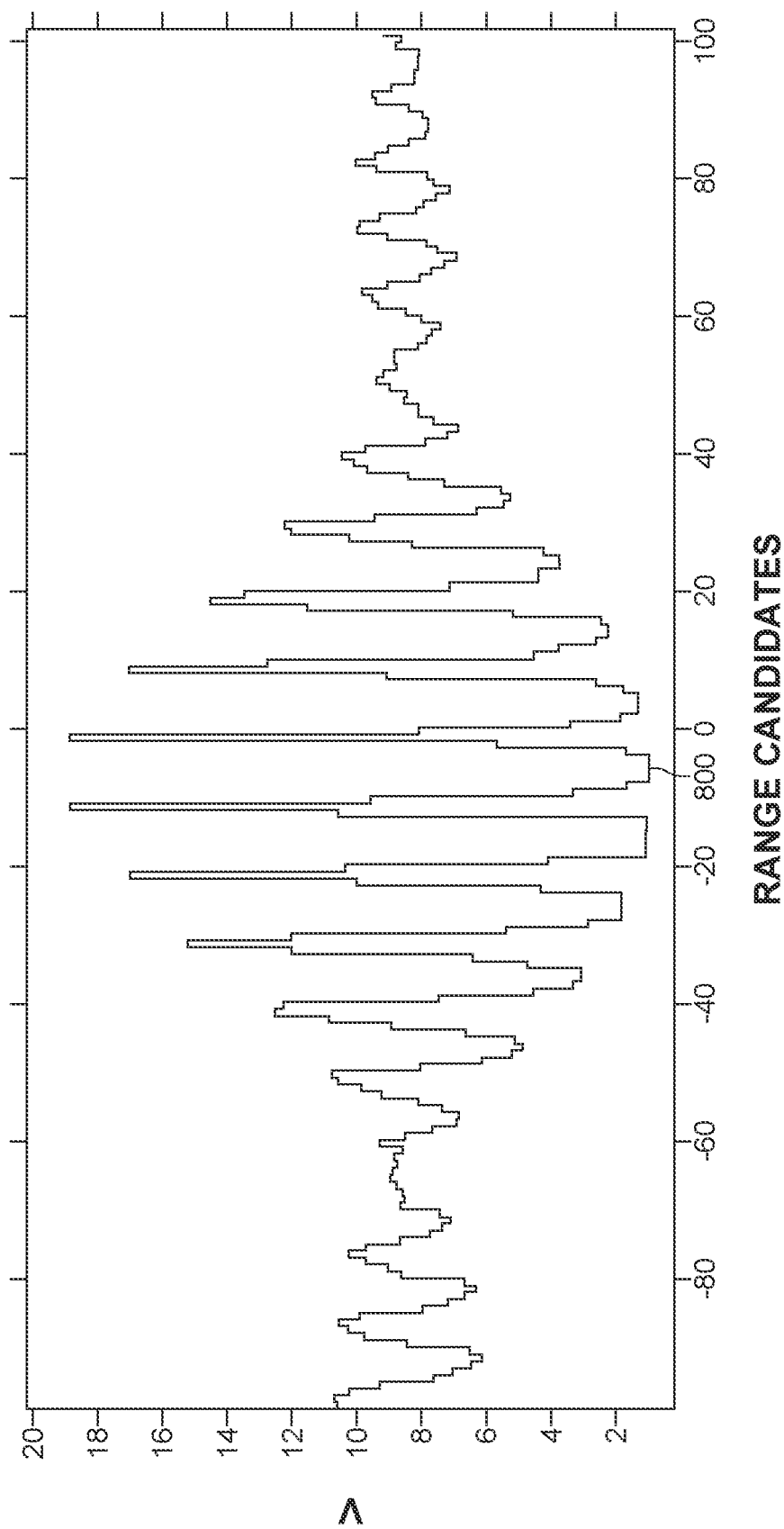
FIG. 8 illustrates range candidates for the minimum variance search.

The method according to this embodiment estimates the refinement variance $V_i$ at different range candidates. The range candidate that has the minimum refinement variance over the valid frequency bins is chosen as the correct range estimate. FIG. 8 plots the refinement variance $V_i$ for a window of 200 range candidates after compensating for the frequency offsets under low SNR (−10 dB). The initial range estimate $d_{corr}$ has an error of 6 samples, hence the location of the minimum variance 800 is at −6. Therefore, the minimum variance search algorithm enables to correct the initial range to within one wavelength of the signal.

Whether the full-fledged ML receiver or its high SNR equivalent correlation is implemented, the proposed algorithm has a much lower complexity compared to the existing methods. While the performance of the proposed algorithm is slightly degraded compared to the DZC MVUE, it still outperforms the ZC MVUE.

To test the algorithms discussed above, the following hardware has been used in an experimental setup. The transmitter 120 ($T_x$) is a Pioneer TS-T110 tweeter which has a bandwidth of 7 KHz with a central frequency of 20 KHz. The receiver 110 (Rx) is a microphone on a Printed Circuit Board (PCB). XLR connectors link the transmitter and the receiver to a PC 130 through a sound card that provides a sampling rate up to 192 KHz. The data is recorded as .wav files during experiments and saved in the PC 130 to be processed off-line. The experiments are implemented in a typical indoor environment with dimensions of 300 cm×300 cm×400 cm. The speed of sound is assumed to be constant during the experiments (345.664 m/s) due to the negligible changes in temperature and humidity. An infrared tracking system 140, which gives the ground truth with 0.1 mm resolution and a maximum data rate of 300 Hz, provides a benchmark for evaluating the performance of the proposed system. The infrared tracking system 140 uses a set of infrared cameras 142, 144 (up to eight cameras) to keep track of retro-reflective film coated small spheres associated with the transmitter 120 for providing accurate 3D location and orientation of the target.

Figure 9:
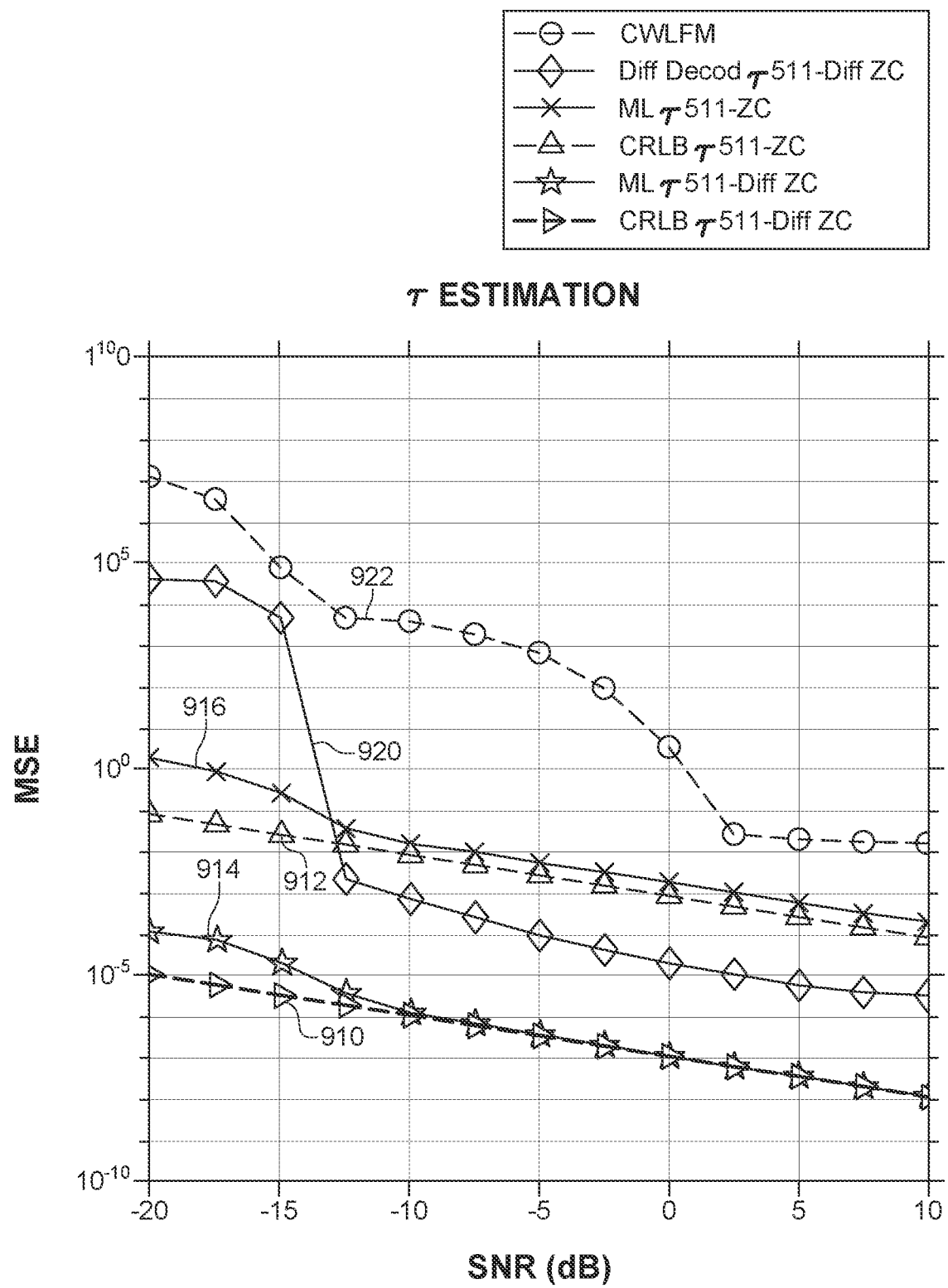
FIG. 9 illustrates simulated MSE for the time of flight versus signal-to-noise ratio (SNR)

With this setup, the performance of the differential sliding correlation of the DZC sequences in estimating the range of a moving target and three other algorithms is investigated. The three other algorithms are the short-time Fourier transform (STFT) on FMCW, the ML estimator using regular ZC sequences, and the ML estimator using the differential ZC sequence derived in equations (13) and (14). For each of the four algorithms, a signal with a duration of 120 ms is generated by the transmitter 120. The transmitter 120 moves with a velocity of 1 m/s and its movement is simulated using MATLAB. The received signal y(t) is composed of the delayed, Doppler shifted transmitted signal with additive white Gaussian noise (AWGN). The mean square error (MSE) of the estimated TOF using the four algorithms and the CRLB for both the regular ZC and the differential ZC sequences are shown in FIG. 9. In this simulation, a sampling frequency of 192 KHz was used, which makes each sample represents around 1.78 mm.

FIG. 9 shows that the CRLB 910 for the differential ZC sequences is lower than the CRLB 912 for the regular ZC sequences, which means that differential ZC sequences can achieve higher ML estimation 914 accuracy compared to the ML estimation 916 with the regular ZC sequences. Also, the ML estimation of both the regular and differential ZC sequences reach the CRLB in the high SNR scenarios (i.e., the right hand side part of the graph). The differential sliding correlation 920 of the differential ZC sequences outperforms the ML estimation 916 using regular ZC sequences under the high SNR scenarios. Under the low SNR scenario, the ML estimation 914 has the best performance among the four algorithms. Also, the differential sliding correlation 920 ranging based on differential ZC sequences outperforms the FMCW ranging algorithm. FIG. 9 also shows the results 922 when the continuous wave linear frequency modulated (CWLFM) algorithm is used. Table I in FIG. 10 shows the running time in ms for each of the four algorithms to estimate the range of the target. From the table, it can be seen that the differential sliding correlation (Diff Corr) has the lowest computational complexity among the four algorithms.

Figure 11:
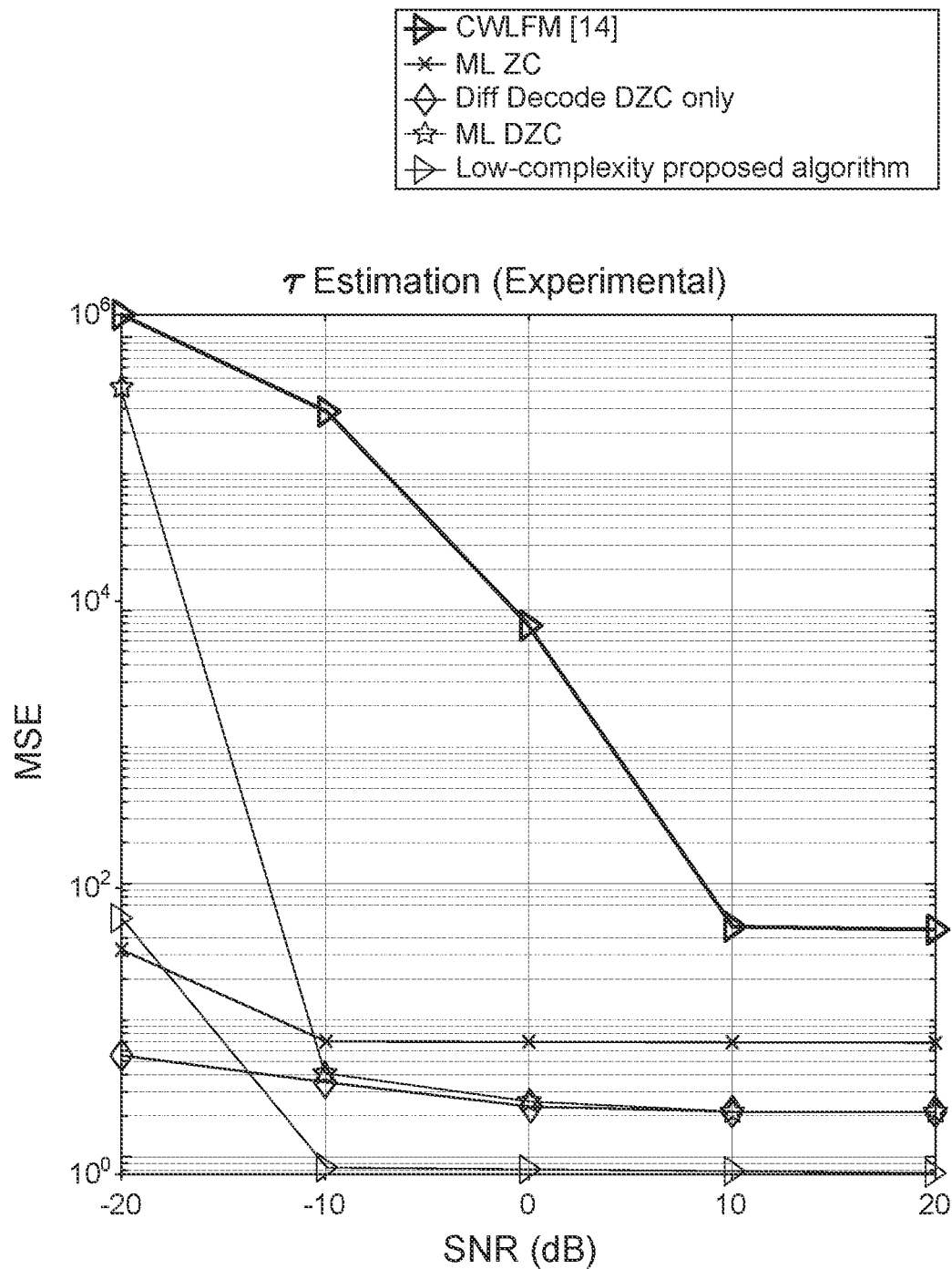
FIG. 11 illustrates experimental MSE for the time of flight versus signal-to-noise ratio (SNR)
Figure 12A:
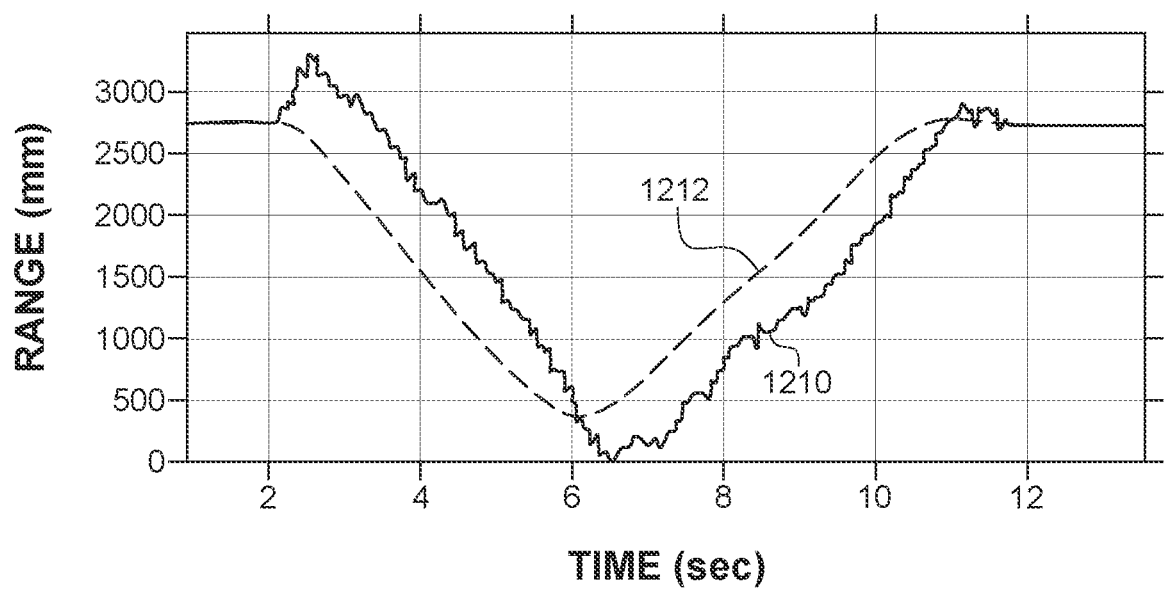
FIGS. 12A and 12B illustrate the range estimation for the Zadoff-Chu sequence and for the differential Zadoff-Chu sequence.

Experimental results of the proposed system 100 shown in FIG. 1 are now discussed. FIG. 11 shows the experimental results of TOF estimation using the three types of signals under different SNR scenarios. A first experiment demonstrates the limitations of the typical ZC sequence where a set of 512-symbol ZC sequence is used to track the moving transmitter. The estimated range is accurate when the transmitter is stationary. However, during the movement, the ranging accuracy significantly degrades due to Doppler. FIG. 12A shows the estimated range 1210 using the regular ZC sequence, where the accuracy degradation due to Doppler shift is clear on the plot when compared with the groundtruth 1212.

Figure 12B:
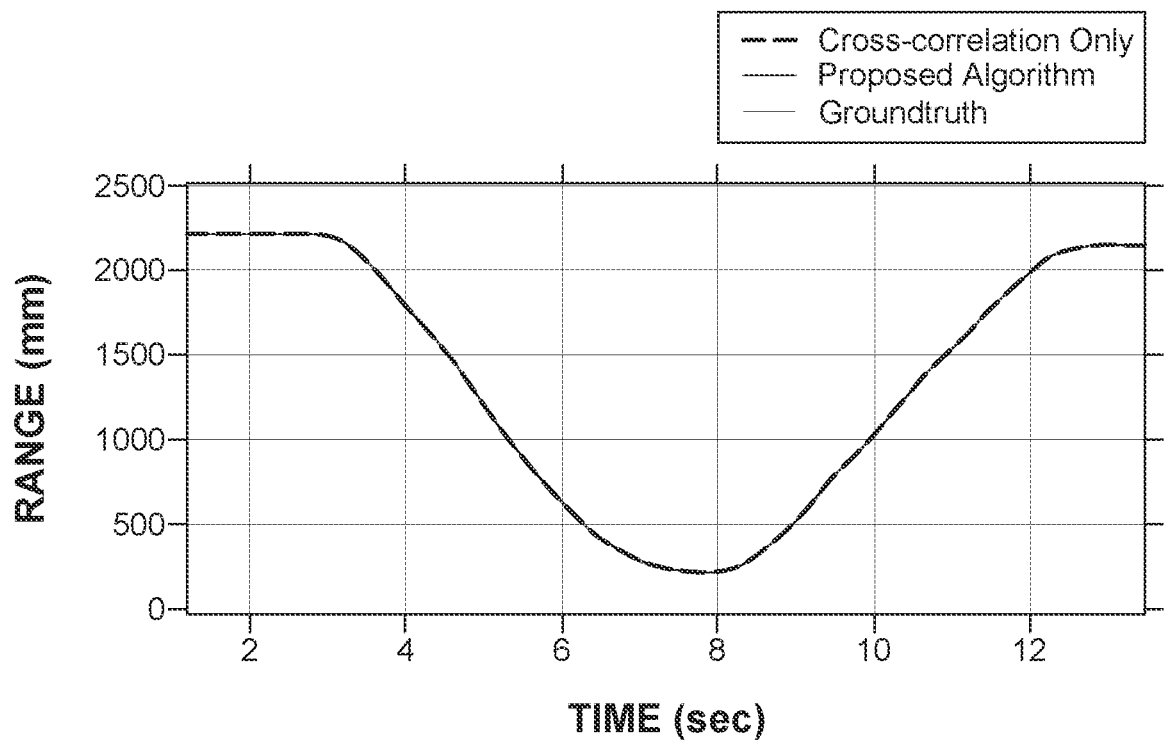

In another experiment, which uses the proposed differential ZC to combat the Doppler effect, the proposed algorithm's estimated range and the groundtruth coincide, as illustrated in FIG. 12B. In this experiment, a set of 512-symbol differential ZC sequence is utilized to track the moving transmitter with a velocity similar to the velocity in the first experiment. FIG. 12B illustrates the ability of the differential ZC sequence to track movements without being affected by the Doppler shift. Table II in FIG. 13 shows the root mean square error (RMSE) and the variance of the estimated range in those two experiments. Since the long regular ZC sequences fail to estimate the range of a moving object, all the comparisons in the rest of this section are based on using the differential ZC sequences.

Figure 14:
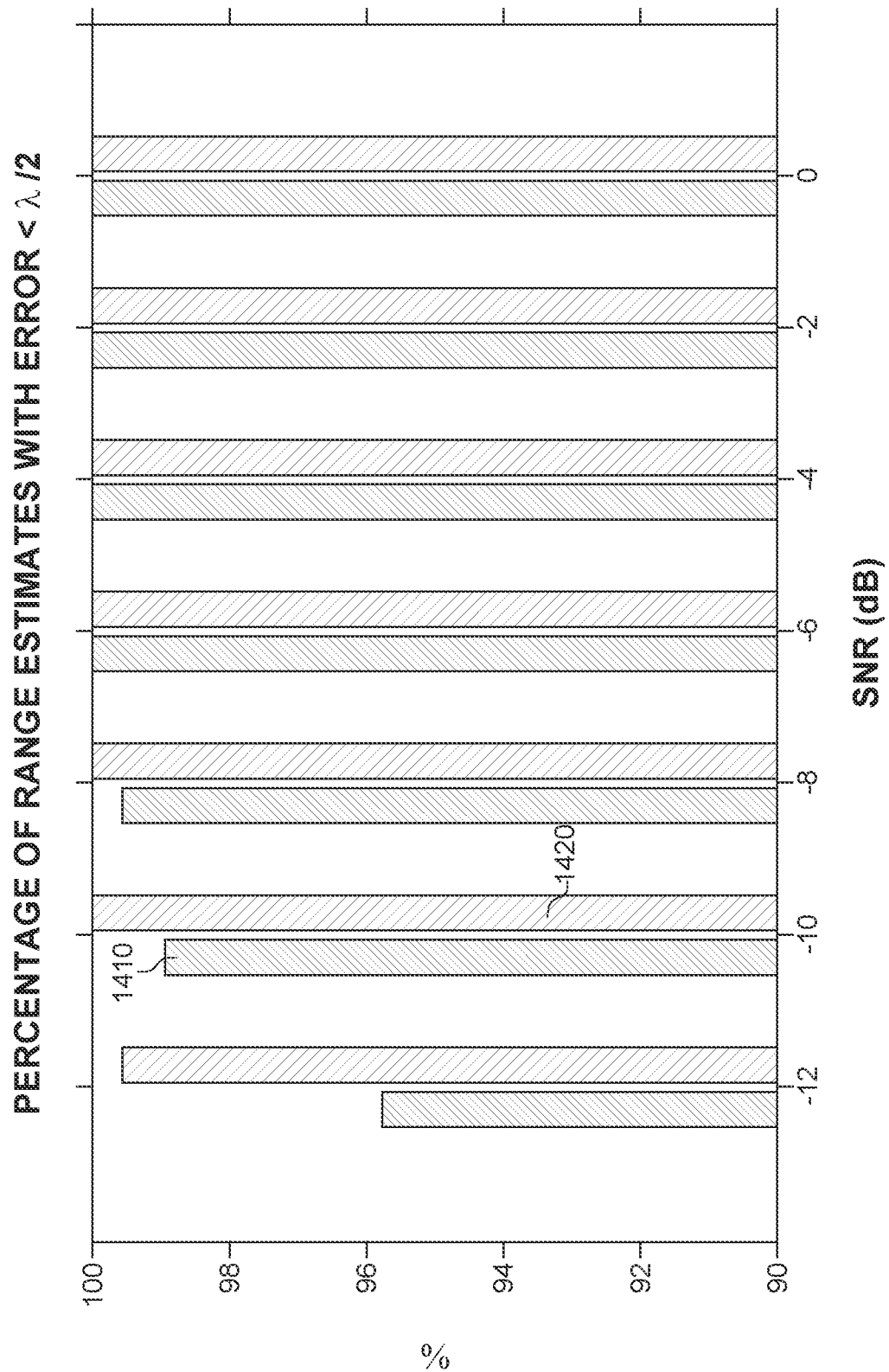
FIG. 14 illustrates the percentage of correct estimates for up to half of the minimum wavelength.
Figure 15A:
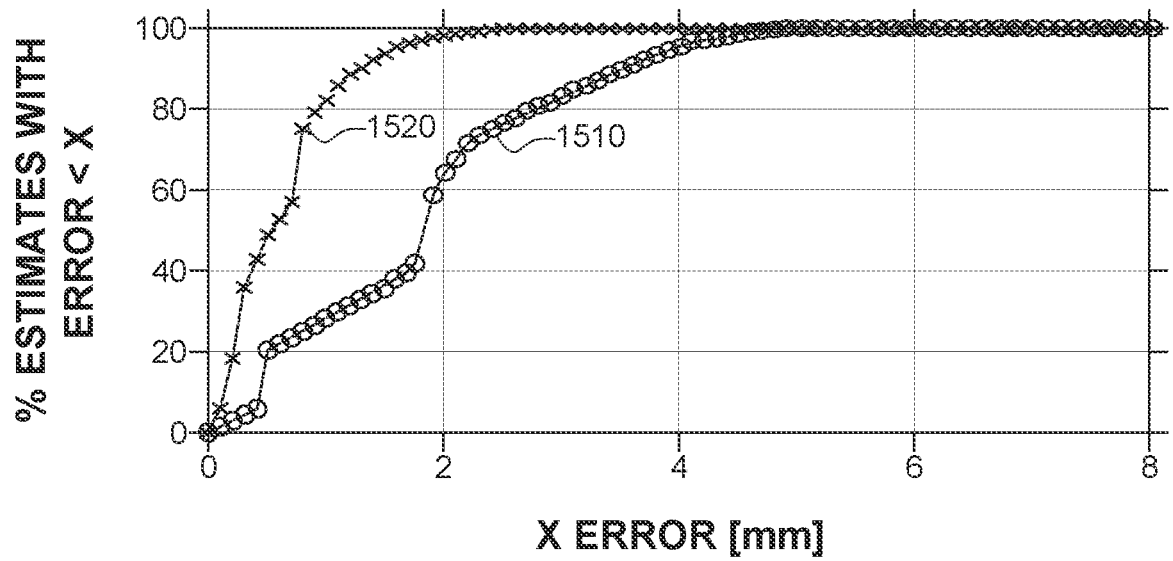
FIGS. 15A to 15D illustrate the cumulative error in the range estimate for various SNRs.
Figure 15B:
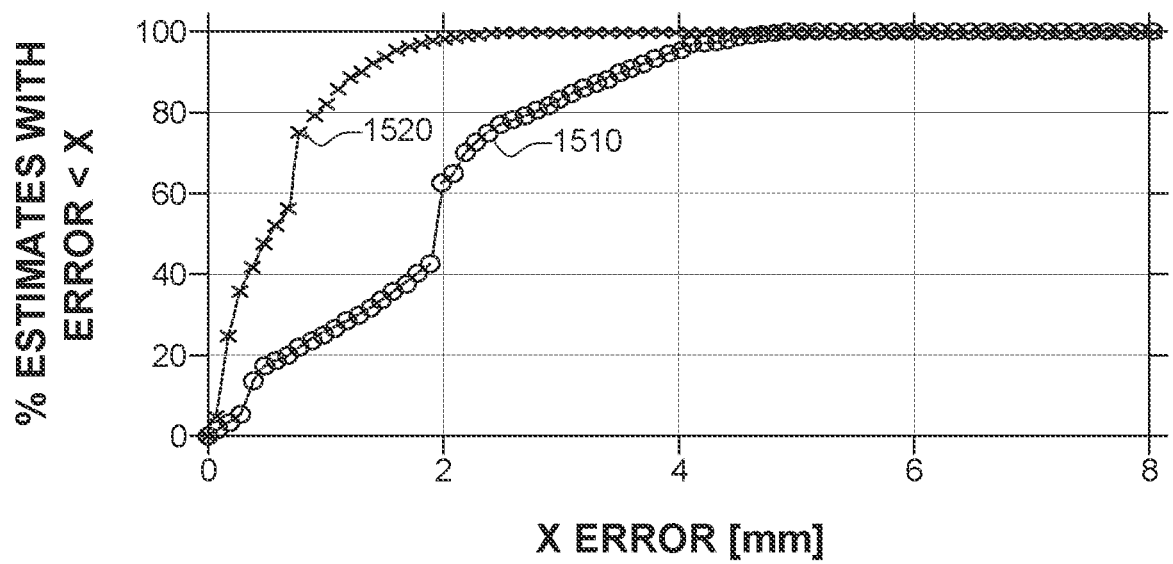
Figure 15C:
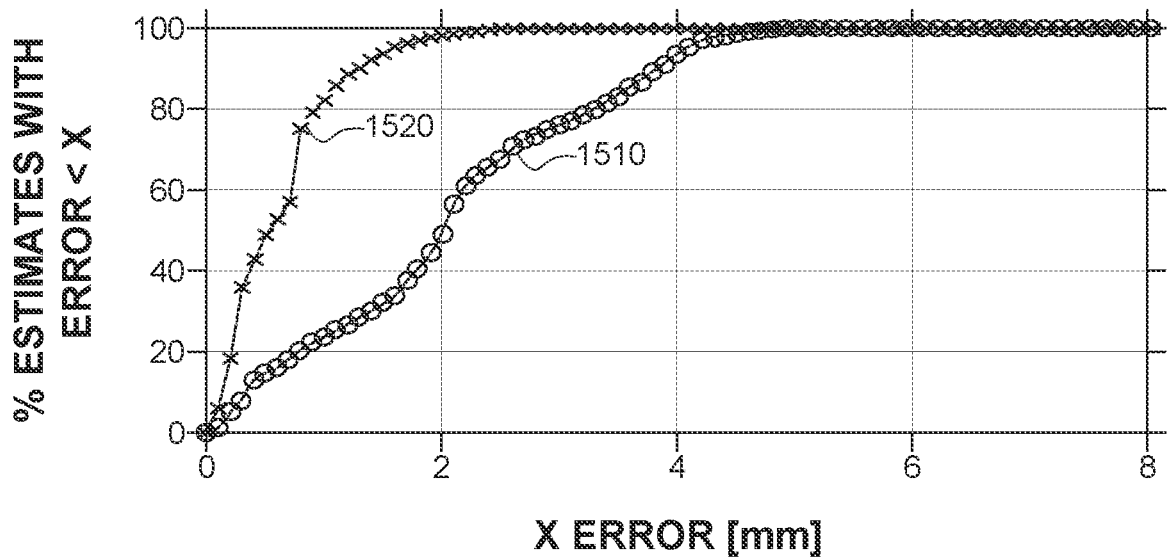
Figure 15D:
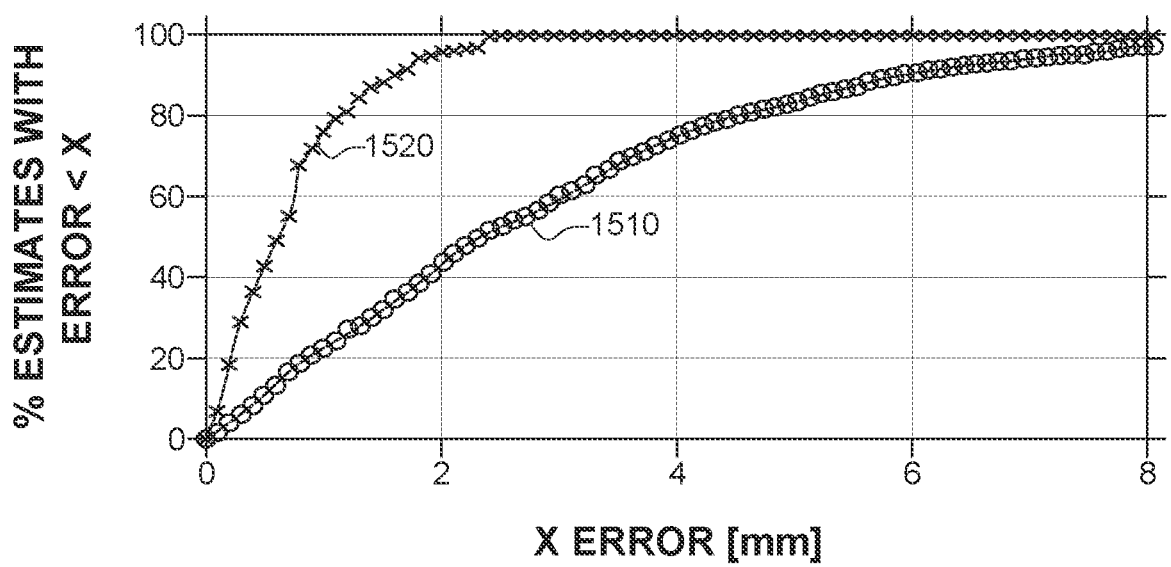

The recorded data is processed under different SNR values, by adding white Gaussian noise to the data in the MATLAB, to validate the minimum refinement variance search algorithm which should provide robustness to the system. FIG. 14 shows the percentage of range estimates that are correct up to half the wavelength of the maximum frequency (around 7.5 mm). As the SNR goes lower, the accuracy of the ranges 1410 estimated without using the minimum refinement variance search degrades, while the estimates of the ranges 1420 obtained using the minimum variance search maintain a high-accuracy. FIGS. 15A to 15D show the cumulative error 1510 without using the minimum refinement variance search algorithm and the cumulative error 1520 using the minimum refinement variance search algorithm, under different SNR values. More specifically, the data in FIG. 15A is generated when SNR is 20 dB, the data in FIG. 15B is generated for SNR 10 dB, the data in FIG. 15C is generated for SNR 0 dB, and the data in FIG. 15D is generated for SNR −10 dB using a 512-symbol sequence. These figures show that using the minimum refinement variance search algorithm always improves the accuracy of the estimated range.

Table III in FIG. 16 shows the RMSE and the variance of the estimated ranges under different SNR values using only the cross-correlation, and using the proposed ranging algorithm, which utilizes the cross-correlation with minimum refinement variance search and phase shift compensation to reach the subsample accuracy. The phase refinement improves the initial range estimates to a very high-accuracy even under the low SNR scenario.

Figure 17A:
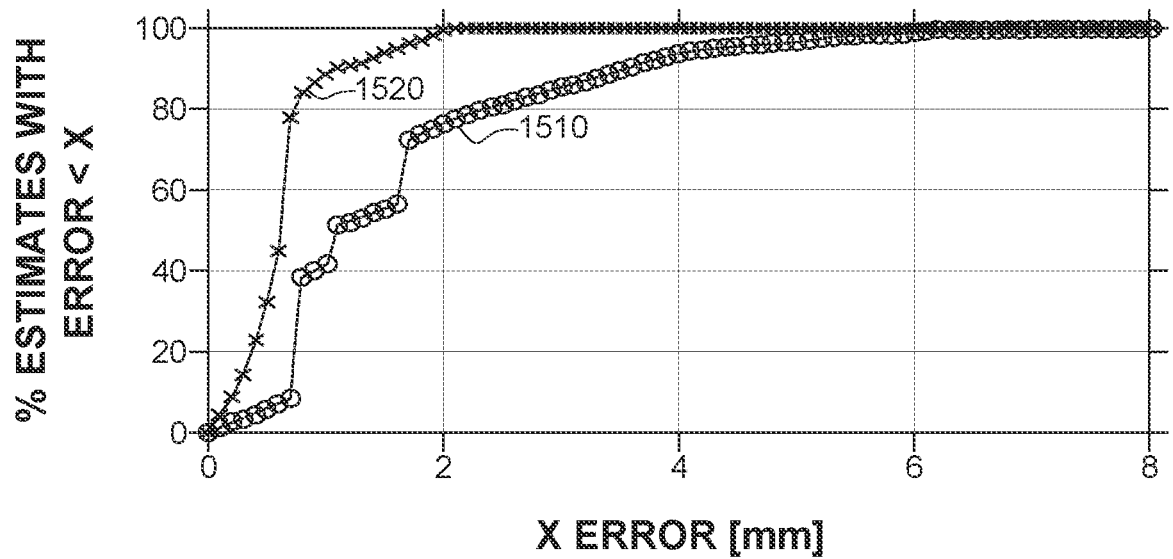
FIGS. 17A and 17B illustrate the cumulative error of the estimated ranges for different code lengths with and without phase adjustment.
Figure 17B:
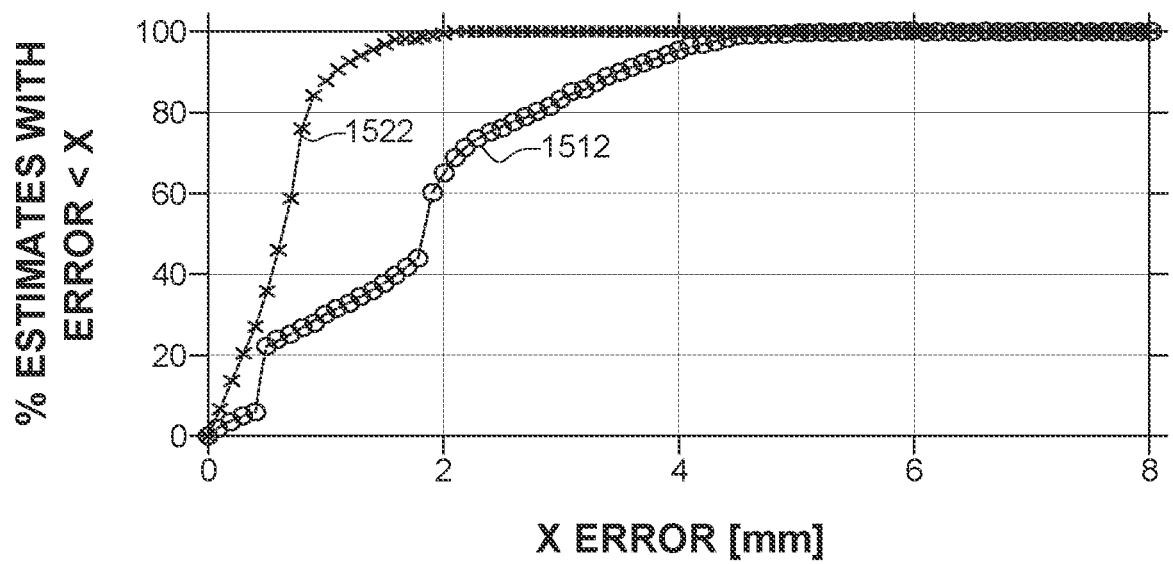

The experiment was repeated with differential ZC sequences of different lengths (16, 32, 64, 128, 256, 512 symbols) to evaluate the proposed algorithms in estimating the range under different SNR scenarios. FIGS. 17A and 17B show the cumulative errors 1510 and 1512 in the estimated range utilizing differential ZC sequences of 16 symbols and 512 symbols, respectively, using only cross-correlation, and also the cumulative errors 1520 and 1522 obtained by using the proposed algorithm under the high SNR scenario (20 dB). Both sequences achieve a high-accuracy and the phase refinement significantly improves the range estimation accuracy. These figures demonstrate the improvement in the estimated ranges after applying the phase refinement algorithm.

Table IV in FIG. 18 shows the RMSE of range estimates utilizing differential ZC sequences of different lengths using the proposed ranging algorithm under different SNR values (20 dB, 10 dB, 0 dB and −10 dB). Under high SNR values, all sequences provide high-accuracy range estimation with a very low RMSE. However, in a low SNR scenario, the accuracy degrades significantly for most of the sequences, especially the short sequences, which results in a high RMSE. In contrast, the long sequence of 512 symbols provides very accurate range estimates under all SNR scenarios including the −10 dB. This shows the advantage of using long sequences especially in low SNR scenarios.

These experiments show that the novel signal design based on the differential coding of ZC sequences is more appropriate for estimating the range of a moving target. The proposed differential ZC design and ranging algorithms were evaluated both by simulations and using an experimental setup in a typical indoor environment. The simulation results show that the ML estimation of the range of a moving target using DZC sequences outperforms the ML estimation using regular ZC sequence. Moreover, the differential sliding correlation using a DZC sequence outperforms the STFT based range estimation using a FMCW and ML range estimation using a regular ZC sequence. Furthermore, the differential sliding correlation has the lowest computational complexity in estimating the range of a moving target compared to the benchmark algorithms.

The experimental results show that while the long typical ZC sequence fails to estimate the range of a moving target, the proposed differential ZC sequence is able to combat the Doppler shift, which provides a high-accuracy range estimation of a moving target. The minimum refinement variance search algorithm is able to correct the range estimates up to half the wavelength of the signal carriers even in low SNR scenarios, which provides increased robustness of the system. At low SNR (−12 dB), the minimum refinement variance search algorithm results in 98% correct range estimates up to half wavelength of the signal carriers, compared to 92% accuracy when not using the novel algorithm. The system was evaluated using differential ZC sequences of different lengths (16, 32, 64, 128, 256 and 512 symbols). Under high SNR scenarios, the RMSE and the variance of the estimated ranges do not exceed 1.39 mm and 1.94 mm$^2$, respectively. A sequence of 512 symbols provides range estimates with a RMSE of 0.75 mm and a variance of 0.56 mm$^2$, which shows the ability of the proposed system to achieve sub-sample resolution (the sample resolution in this work is 1.8 mm). Under low SNR values, the estimated ranges utilizing short sequences have a low-accuracy. However, a long sequence of 512 symbols provides a high-accuracy range estimation even under the low SNR scenario. More than 90% of the range estimates using 512-symbol sequence are in less than 1.6 mm error under 20 dB, 10 dB, 0 dB and −10 dB SNR values, which show the advantage of using long sequences in enhancing the robustness of the proposed system. While applying differential decoding at the receiver provides a great improvement in robustness in view of the Doppler shifts, it has the effect of reducing the performance with respect to coherent cross-correlation.

Figure 19:
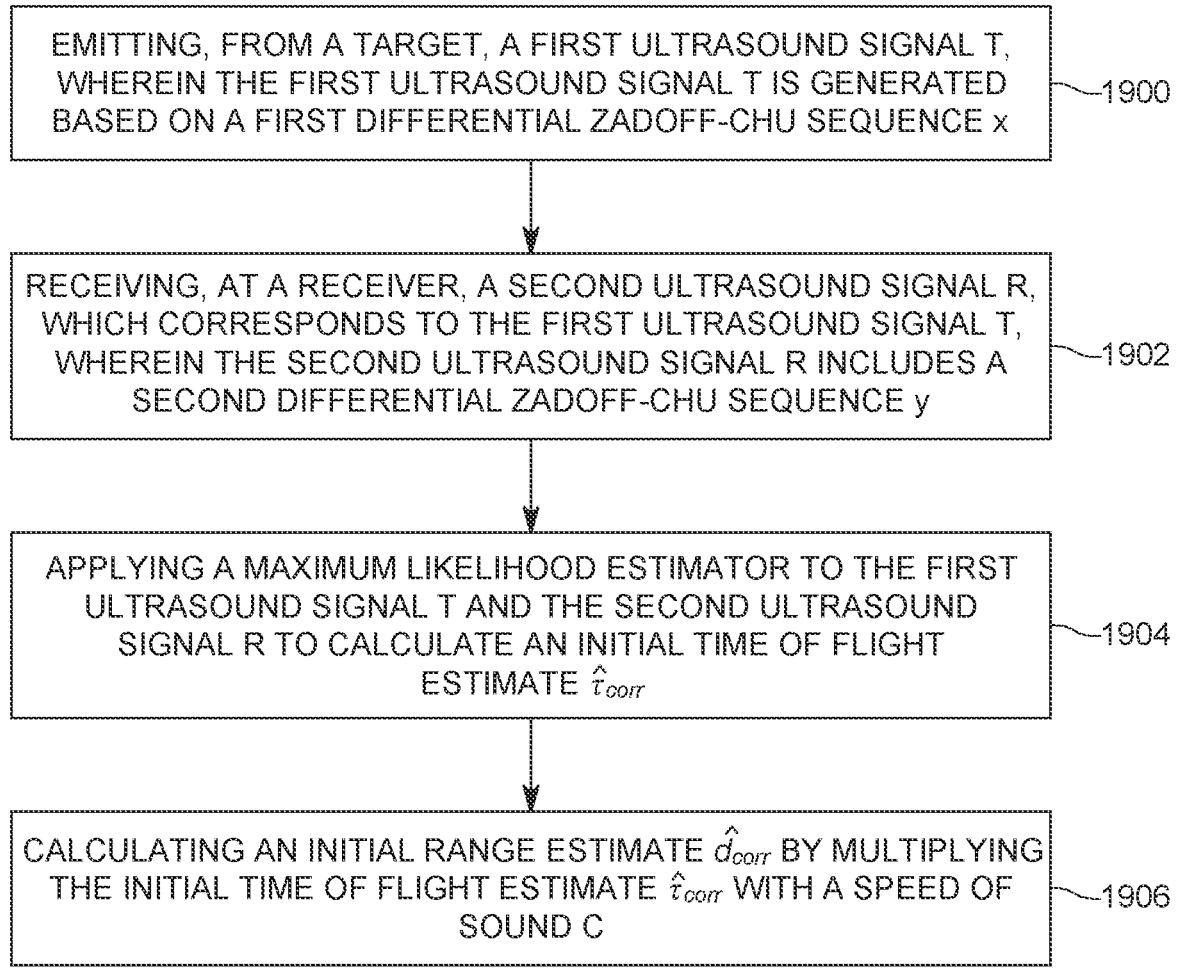
FIG. 19 is a flowchart of a first method for calculating an estimate range for a moving target.

A first method for estimating a range of a moving target based on the metric (34) is now discussed with regard to FIG. 19. The method includes a step 1900 of emitting, from the target 120, a first ultrasound signal T, wherein the first ultrasound signal T is generated based on a first differential Zadoff-Chu sequence x, a step 1902 of receiving, at the receiver 110, a second ultrasound signal R, which corresponds to the first ultrasound signal T, wherein the second ultrasound signal R includes a second differential Zadoff-Chu sequence y, a step 1904 of applying a maximum likelihood estimator to the first ultrasound signal T and the second ultrasound signal R to calculate an initial time of flight estimate $\hat{\tau}_{corr}$, and a step 1906 of calculating an initial range estimate $\hat{d}_{corr}$ by multiplying the initial time of flight estimate $\hat{\tau}_{corr}$ with a speed of sound, where a differential Zadoff-Chu sequence is different from a Zadoff-Chu sequence.

The first and second differential Zadoff-Chu sequences are periodic, with a period of N if N is odd and not divisible by 3, 3N if N is odd and divisible by 3, 4N if N is even and either (2N−1) or (N−1) is divisible by 3, and 12N otherwise, where N is a length of the sequence. In one application, the first and second differential Zadoff-Chu sequences are exponentials having an exponent proportional to k−1, where k is a discrete-time under a Doppler condition. The exponents of the first and second differential Zadoff-Chu sequences are further proportional to k+1 and k and ⅓.

In one application, the step of applying the ML estimator further includes calculating a probability p of the received second differential Zadoff-Chu sequence y to maximize the ML estimator, with regard to the time of flight and a Doppler shift, averaging the probability distribution function over the random phase shift of the second differential Zadoff-Chu sequence y, approximating the ML estimator using a Bessel function, using an equivalent log-likelihood function for the ML estimator, defining a metric M for the ML estimator based on the second differential Zadoff-Chu sequence y and a conjugate of the first differential Zadoff-Chu sequence x, and using the periodicity of the first and second DZC sequences to remove an ambiguity of the ML estimator and calculate the time of flight. The method may also include a step of taking calculating a relative Doppler shift $\hat{\Delta}$ for a segment, and a step of resampling the second ultrasound signal with $1+\hat{\Delta}$ to obtain a corrected second ultrasound signal. The method may also include a step of estimating a phase shift between the first ultrasound signal and the corrected second ultrasound signal, a step of estimating a range refinement $\hat{\Delta}d$ by dividing the estimated phase shift by an associated frequency bin, and multiplying a results of the dividing by the speed of sound, a step of calculating a refined range $\hat{d}$ by adding the estimated range refinement $\hat{\Delta}d$ to the initial range estimate $\hat{d}_{corr}$, and/or a step of performing a minimum refinement variance search.

Figure 20:
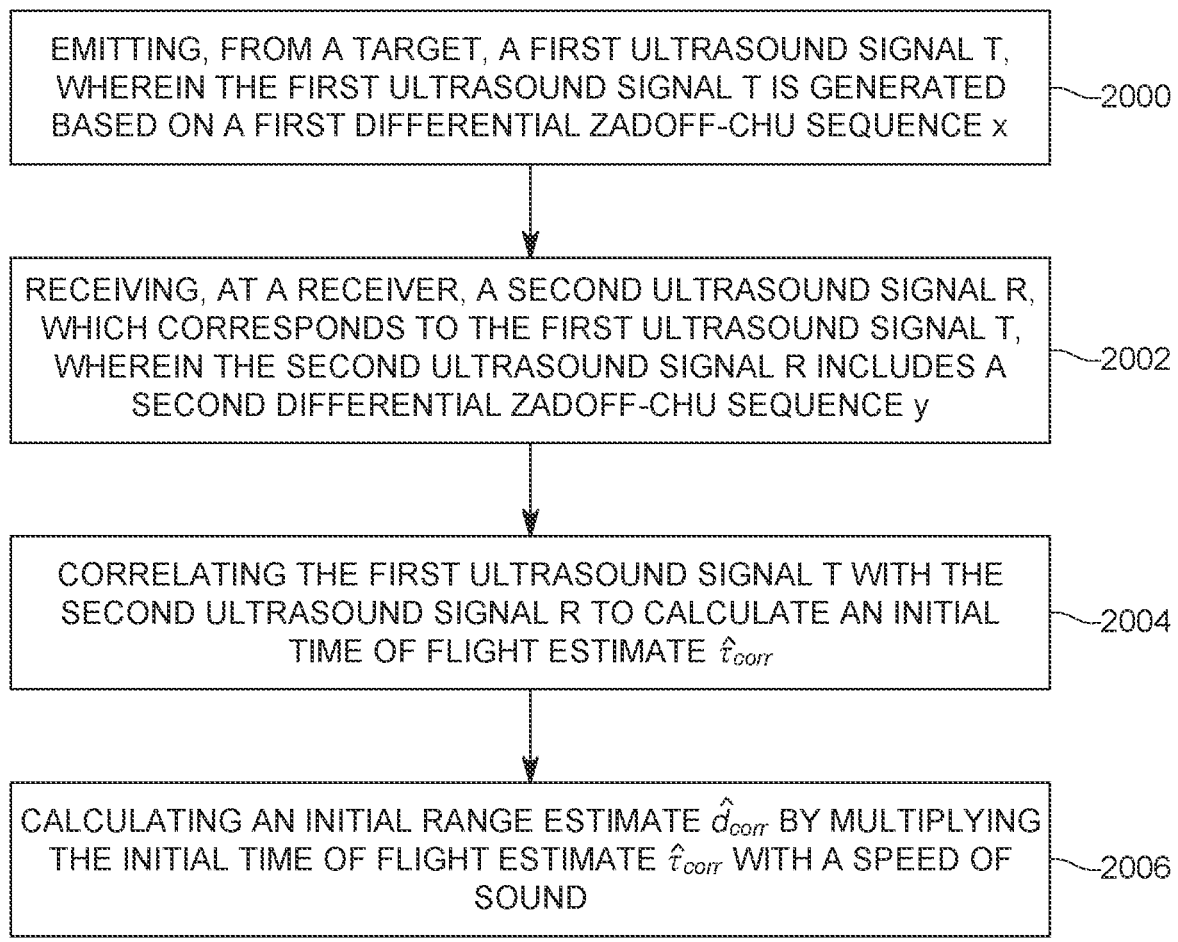
FIG. 20 is a flowchart of a second method for calculating an estimate range for a moving target.

Note that all the embodiments discussed above with regard to the Doppler estimation and compensation (see, for example, equations (37) to (38)), phase shift estimation (see, for example, equations (39) to (43)), and Minimum refinement variance search (see, for example, equation (44)) are applicable to this method and the next method discussed with regard to FIG. 20. In other words, one skilled in the art, would understand that any of these equations can be implemented in the methods shown in FIGS. 19 and 20.

A second method for estimating a range of a moving target based on the is now discussed with regard to equation (20). The method includes a step 2000 of emitting, from the target 120, a first ultrasound signal T, wherein the first ultrasound signal T is generated based on a first differential Zadoff-Chu sequence x, a step 2002 of receiving, at the receiver 110, a second ultrasound signal R, which corresponds to the first ultrasound signal T, wherein the second ultrasound signal R includes a second differential Zadoff-Chu sequence y, a step 1004 of correlating the first ultrasound signal T with the second ultrasound signal R to calculate an initial time of flight estimate $\hat{\tau}_{corr}$, and a step 2006 of calculating an initial range estimate $\hat{d}_{corr}$ by multiplying the initial time of flight estimate $\hat{\tau}_{corr}$ with a speed of sound, where a differential Zadoff-Chu sequence is different from a Zadoff-Chu sequence.

The first and second differential Zadoff-Chu sequences are periodic, with a period of N if N is odd and not divisible by 3, 3N if N is odd and divisible by 3, 4N if N is even and either (2N−1) or (N−1) is divisible by 3, and 12N otherwise, where N is a length of the sequence. In one application, the first and second differential Zadoff-Chu sequences are exponentials having an exponent proportional to k−1, where k is a discrete-time under a Doppler condition. The exponents of the first and second differential Zadoff-Chu sequences are further proportional to k+1 and k and ⅓.

In one application, the step of correlating further includes applying a differential sliding correlation $r_D$ that calculates a sum of a product made up of (1) a complex conjugate of the first differential Zadoff-Chu sequence, (2) the first differential Zadoff-Chu sequence modified with a correlation step m, (3) the second differential Zadoff-Chu sequence modified with a natural number n, and (4) a complex conjugate of the second differential Zadoff-Chu sequence modified with m and n. The method may also include a step of taking an absolute value of the differential sliding correlation $r_D$ to find a maximum, which corresponds to the initial time of flight estimate $\hat{\tau}_{corr}$, and/or a step of calculating a relative Doppler shift $\hat{\Delta}$ for a segment, and a step of resampling the second ultrasound signal with $1+\hat{\Delta}$ to obtain a corrected second ultrasound signal. The method may also include a step of estimating a phase shift between the first ultrasound signal and the corrected second ultrasound signal, a step of estimating a range refinement $\hat{\Delta}d$ by dividing the estimated phase shift by an associated frequency bin, and multiplying a results of the dividing by the speed of sound, a step of calculating a refined range $\hat{d}$ by adding the estimated range refinement $\hat{\Delta}d$ to the initial range estimate $\hat{d}_{corr}$, and/or a step of performing a minimum refinement variance search.

The disclosed embodiments provide a method and device for more accurately calculating a range of a moving target. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] M. H. AiSharif, M. Saad, M. Siala, T. Ballal, H. Boujemaa, and T. Y. AI-Naffouri, "Zadoff-chu coded ultrasonic signal for accurate range estimation," in Signal Processing Conference (EUSIPCO), 2017 25th European. IEEE, 2017, pp. 1250-1254.

[2] W. Mao, J. He, and L. Qiu, "Cat: high-precision acoustic motion tracking," in Proceedings of the 22nd Annual International Conference on Mobile Computing and Networking. ACM, 2016, pp. 69-81.

[3] R. Frank, S. Zadoff, and R. Heimiller, "Phase shift pulse codes with good periodic correlation properties (corresp.)," IRE Transactions on Information Theory, vol. 8, no. 6, pp. 381-382, 1962.

[4] D. Chu, "Polyphase codes with good periodic correlation properties (corresp.)," IEEE Transactions on Information Theory, vol. 18, no. 4, pp. 531-532, 1972.

[5] R. Diamant, A. Feuer, and L. Lampe, "Choosing the right signal: Doppler shift estimation for underwater acoustic signals," in Proceedings of the Seventh ACM International Conference on Underwater Networks and Systems. ACM, 2012, p. 27.

[6] B. S. Sharif, J. Neasham, O. R. Hinton, and A. E. Adams, "A computationally efficient doppler compensation system for underwater acoustic communications," IEEE Journal of oceanic engineering, vol. 25, no. 1, pp. 52-61, 2000.

[7] M. M. Saad, C. J. Bleakley, and S. Dobson, "Robust high-accuracy ultrasonic range measurement system," IEEE Transactions on Instrumentation and Measurement, vol. 60, no. 10, pp. 3334-3341, 2011.

What is claimed is:

1. A method for estimating a range of a moving target, the method comprising:

emitting, from a target, a first ultrasound signal T, wherein the first ultrasound signal T is generated based on a first differential Zadoff-Chu sequence x;

receiving, at a receiver, a second ultrasound signal R, which corresponds to the first ultrasound signal T, wherein the second ultrasound signal R includes a second differential Zadoff-Chu sequence y;

correlating the first ultrasound signal T with the second ultrasound signal R to calculate an initial time of flight estimate $\hat{\tau}_{corr}$; and calculating an initial range estimate $\hat{d}_{corr}$ by multiplying the initial time of flight estimate $\hat{\tau}_{corr}$ with a speed of sound c, wherein the first and second differential Zadoff-Chu sequences are different from a Zadoff-Chu sequence as the first and second differential Zadoff-Chu sequences are periodic, with a period of: (1) N if N is odd and not divisible by 3, (2) 3N if N is odd and divisible by 3, (3) 4N if N is even and either (2N−1) or (N−1) is divisible by 3, and (4) 12N otherwise, where N is a length of the first and second differential sequences.

2. The method of claim 1, wherein the first and second differential Zadoff-Chu sequences are exponentials having an exponent proportional to k−1, where k is a discrete-time under a Doppler condition.

3. The method of claim 1, wherein the exponents of the first and second differential Zadoff-Chu sequences are further proportional to k+1 and k and ⅓.

4. The method of claim 1, wherein the step of correlating further comprises:

applying a differential sliding correlation $r_D$ that calculates a sum of a product made up of (1) a complex conjugate of the first differential Zadoff-Chu sequence, (2) the first differential Zadoff-Chu sequence modified with a correlation step m, (3) the second differential Zadoff-Chu sequence modified with a natural number n, and (4) a complex conjugate of the second differential Zadoff-Chu sequence modified with m and n.

5. The method of claim 4, further comprising:

taking an absolute value of the differential sliding correlation ro to find a maximum, which corresponds to the initial time of flight estimate $\hat{\tau}_{corr}$.

6. The method of claim 1, further comprising:

calculating a relative Doppler shift $\hat{\Delta}$ for a segment; and resampling the second ultrasound signal with 1+$\hat{\Delta}$ to obtain a corrected second ultrasound signal.

7. The method of claim 6, further comprising:

estimating a phase shift between the first ultrasound signal and the corrected second ultrasound signal.

8. The method of claim 7, further comprising:

estimating a range refinement $\hat{\Delta}d$ by dividing the estimated phase shift by an associated frequency bin, and multiplying a result of the dividing by the speed of sound.

9. The method of claim 8, further comprising:

calculating a refined range $\hat{d}$ by adding the estimated range refinement $\hat{\Delta}d$ to the initial range estimate $\hat{d}_{corr}$.

10. The method of claim 9, further comprising:

performing a minimum refinement variance search.

11. A system for estimating a range of a moving target, the system comprising:

the target, which is configured to emit a first ultrasound signal T, wherein the first ultrasound signal T is generated based on a first differential Zadoff-Chu sequence x;

a receiver configured to receive a second ultrasound signal R, which corresponds to the first ultrasound signal T, wherein the second ultrasound signal R includes a second differential Zadoff-Chu sequence y; and a computing device connected to the receiver and configured to, correlate the first ultrasound signal T with the second ultrasound signal R to calculate an initial time of flight estimate $\hat{\tau}_{corr}$, and calculate an initial range estimate $\hat{d}_{corr}$ by multiplying the initial time of flight estimate $\hat{\tau}_{corr}$ with a speed of sound, wherein the first and second differential Zadoff-Chu sequences are different from a Zadoff-Chu sequence as the first and second differential Zadoff-Chu sequences are periodic, with a period of: (1) N if N is odd and not divisible by 3, (2) 3N if N is odd and divisible by 3, (3) 4N if N is even and either (2N−1) or (N−1) is divisible by 3, and (4) 12N otherwise, where N is a length of the first and second differential sequences.

12. The system of claim 11, wherein the first and second differential Zadoff-Chu sequences are exponentials having an exponent proportional to k−1, where k is a discrete-time under a Doppler condition.

13. The system of claim 12, wherein the exponents of the first and second differential Zadoff-Chu sequences are further proportional to k+1 and k and ⅓.

14. The system of claim 11, wherein the computing device is further configured to:

apply a differential sliding correlation $r_D$ that calculates a sum of a product made up of (1) a complex conjugate of the first differential Zadoff-Chu sequence, (2) the first differential Zadoff-Chu sequence modified with a correlation step m, (3) the second differential Zadoff-Chu sequence modified with a natural number n, and (4) a complex conjugate of the second differential Zadoff-Chu sequence modified with m and n.

15. The system of claim 14, wherein the computing device is further configured to:

take an absolute value of the differential sliding correlation $r_D$ to find a maximum, which corresponds to the initial time of flight estimate $\hat{\tau}_{corr}$.

16. The system of claim 11, wherein the computing device is further configured to:

calculate a relative Doppler shift $\hat{\Delta}$ for a segment; and resample the second ultrasound signal with 1+$\hat{\Delta}$ to obtain a corrected second ultrasound signal.

17. The system of claim 16, wherein the computing device is further configured to:

estimate a phase shift between the first ultrasound signal and the corrected second ultrasound signal;

estimate a range refinement $\hat{\Delta}d$ by dividing the estimated phase shift by an associated frequency bin, and multiplying a result of the dividing by the speed of sound; and calculate a refined range $\hat{d}$ by adding the estimated range refinement $\hat{\Delta}d$ to the initial range estimate $\hat{d}_{corr}$.

18. A system for generating a coded ultrasound signal, the system comprising:

a target, which is configured to emit a first ultrasound signal T, wherein the first ultrasound signal T is generated based on a first differential Zadoff-Chu sequence x; and a receiver configured to receive a second ultrasound signal R, which corresponds to the first ultrasound signal T, wherein the second ultrasound signal R includes a second differential Zadoff-Chu sequence y, wherein the first and second differential Zadoff-Chu sequences are different from a Zadoff-Chu sequence as the first and second differential Zadoff-Chu sequences are periodic, with a period of (1) N if N is odd and not divisible by 3, (2) 3N if N is odd and divisible by 3, (3) 4N if N is even and either (2N−1) or (N−1) is divisible by 3, and (4) 12N otherwise, where N is a length of the first and second differential sequences.

\* \* \* \* \*